US012591589B2

(12) United States Patent
Dixit et al.

(10) Patent No.: US 12,591,589 B2
(45) Date of Patent: Mar. 31, 2026

(54) DECENTRALIZED WILL MANAGEMENT APPARATUS, SYSTEMS AND RELATED METHODS OF USE

(71) Applicant: InheritChain Inc., Mississauga (CA)

(72) Inventors: Manish Dixit, Brampton (CA); Sodaba Rameh, Brampton (CA); Sri Harsha Kondapalli, Toronto (CA)

(73) Assignee: INHERITCHAIN INC., Mississauga (CA)

(*) Notice: Subject to any disclaimer, the term of this patent is extended or adjusted under 35 U.S.C. 154(b) by 412 days.

(21) Appl. No.: 18/114,818

(22) Filed: Feb. 27, 2023

(65) Prior Publication Data

US 2023/0274373 A1     Aug. 31, 2023

Related U.S. Application Data

(60) Provisional application No. 63/313,966, filed on Feb. 25, 2022.

(51) Int. Cl.
| | |
|---|---|
| *G06Q 50/18* | (2012.01) |
| *G06F 16/27* | (2019.01) |

(52) U.S. Cl.
CPC ........... *G06F 16/27* (2019.01); *G06Q 50/186* (2013.01)

(58) Field of Classification Search
None
See application file for complete search history.

(56) References Cited

U.S. PATENT DOCUMENTS

| | | | | |
|---|---|---|---|---|
| 2020/0311688 A1* | 10/2020 | Lipman | .............. | G06F 16/1774 |
| 2021/0049717 A1* | 2/2021 | Li | .......................... | H04L 9/3247 |
| 2023/0136059 A1* | 5/2023 | Dwivedi | ................ | G06F 40/40 704/9 |
| 2025/0131519 A1* | 4/2025 | Degenhardt | ......... | G06Q 50/186 |

OTHER PUBLICATIONS

Legal Executive Institute, Reuters.com [online], Jan. 4, 2019, available at: < https://legalsolutions.thomsonreuters.co.uk/blog/2019/01/04/the-application-of-blockchain-in-the-legal-sector/ > (Year: 2019).*

* cited by examiner

*Primary Examiner* — Richard W. Crandall
(74) *Attorney, Agent, or Firm* — Aird & McBurney LP

(57)     ABSTRACT

Provided is a computer-implemented method of creating or managing legal documents, comprising: providing a decentralized legal document management system including a data storage, a distributed ledger and node(s) communicatively coupled over a network, the node(s) including: host node(s) associated with a legal service provider; service node(s) associated with an entity seeking legal service; and processing node(s) comprising an input engine, a legal engine, and a blockchain manager; receiving, using the input engine, input data, the input data including at least a legal service to be provided to the service node(s); generating, using the legal engine, legal clause(s) and/or legal document(s) from a predetermined list, based on the received input data; and storing the legal clause(s) and/or document(s) in the data storage, the data storage accessible by the host node(s) and the service node(s) over the network.

17 Claims, 15 Drawing Sheets

100

Input Data
(e.g., questionnaire, etc.)

User Input

222

212

224

Will Template
(or/and Final Signed Will)

223

Figure 7A:
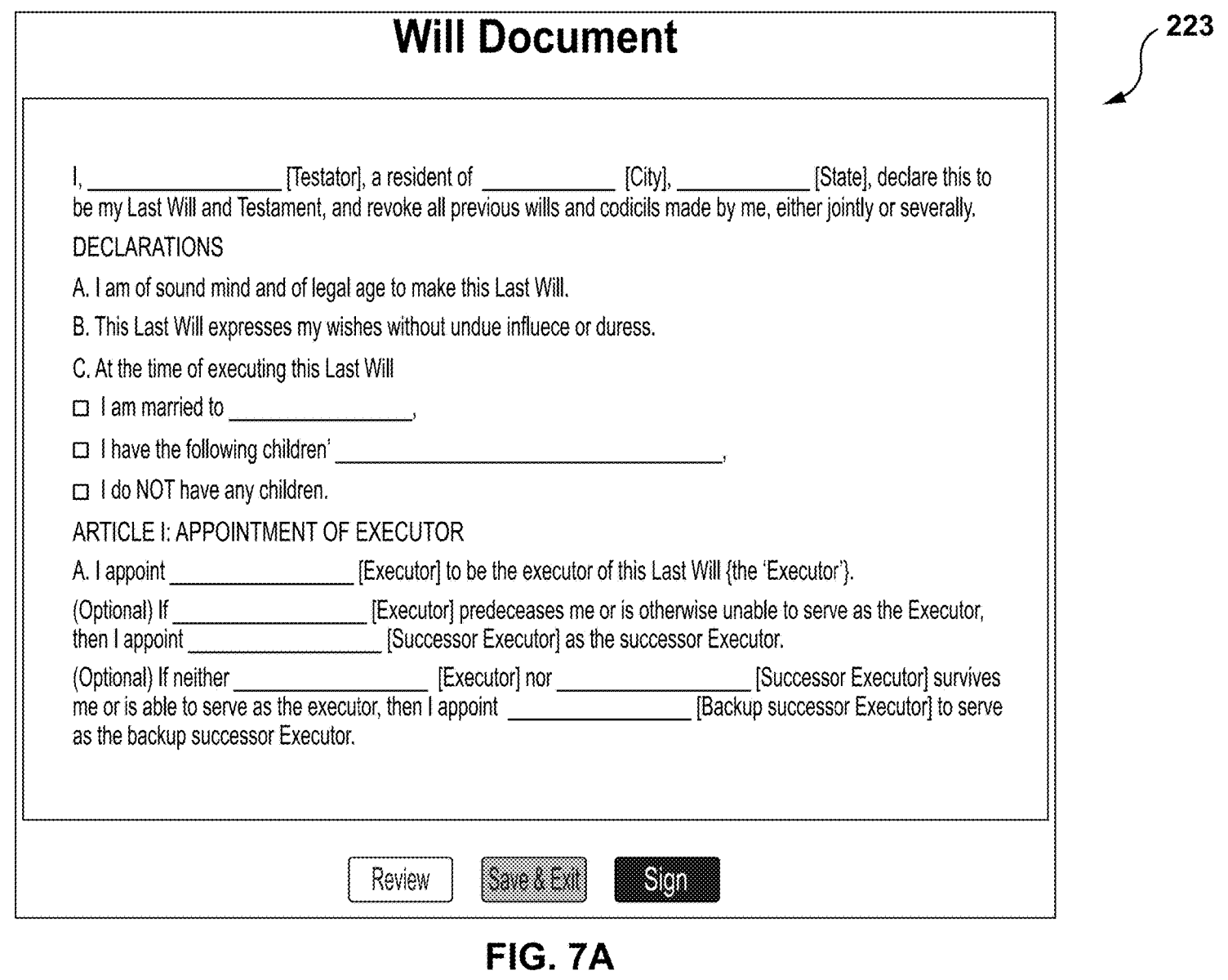

223

Will Document

I, _____ [Testator], a resident of _____ [City], _____ [State], declare this to be my Last Will and Testament, and revoke all previous wills and codicils made by me, either jointly or severally.

DECLARATIONS

A. I am of sound mind and of legal age to make this Last Will.

B. This Last Will expresses my wishes without undue influece or duress.

C. At the time of executing this Last Will

☐ I am married to _____

☐ I have the following children'

☐ I do NOT have any children.

ARTICLE I: APPOINTMENT OF EXECUTOR

A. I appoint _____ [Executor] to be the executor of this Last Will {the 'Executor'}.

(Optional) If _____ [Executor] predeceases me or is otherwise unable to serve as the Executor, then I appoint _____ [Successor Executor] as the successor Executor.

(Optional) If neither _____ [Executor] nor _____ [Successor Executor] survives me or is able to serve as the executor, then I appoint _____ [Backup successor Executor] to serve as the backup successor Executor.

Review     Save & Exit     Sign

Figure 7B:
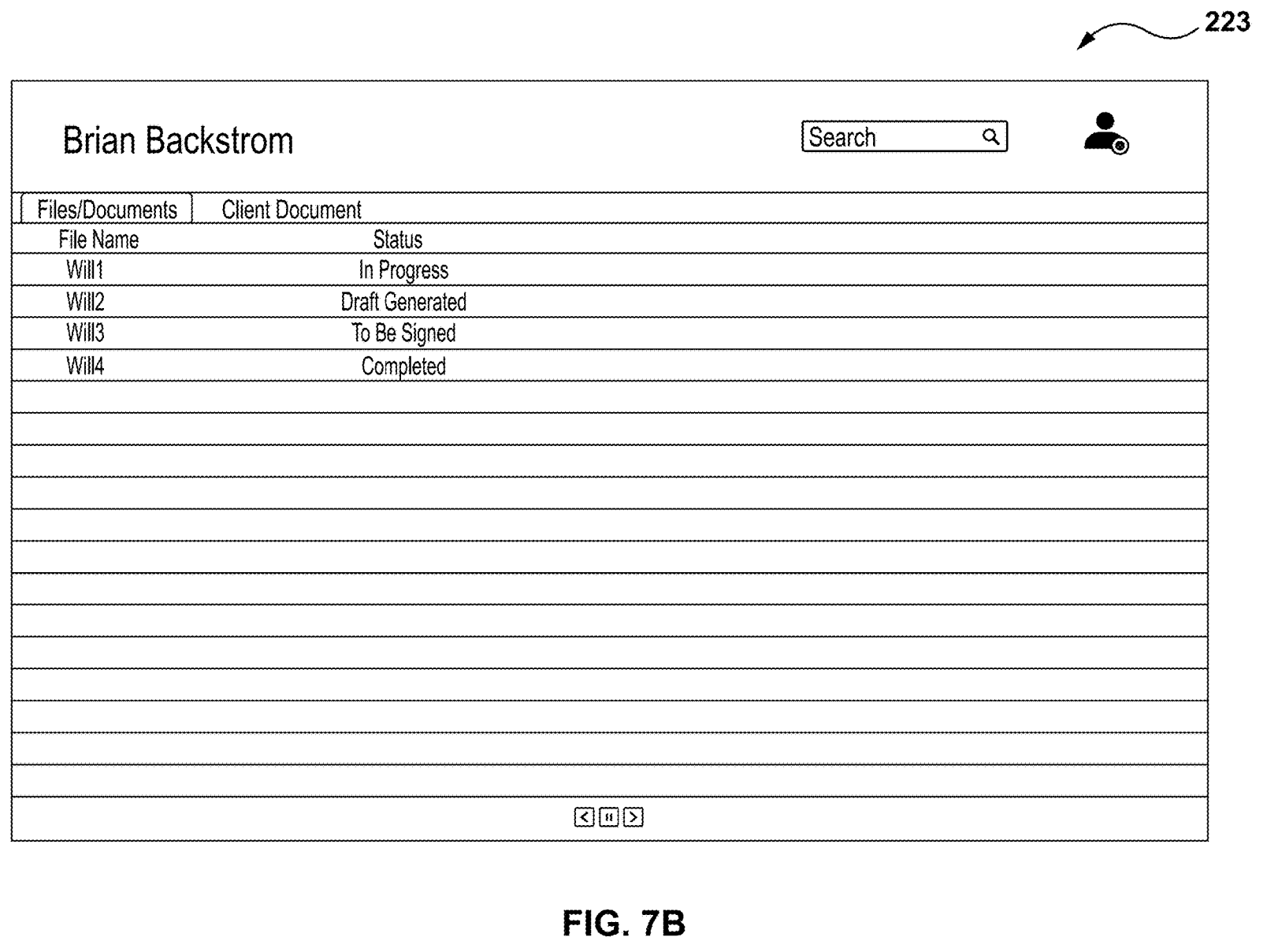

Brian Backstrom

Search 🔍

| Files/Documents | Client Document | |
| --- | --- | --- |
| File Name | Status | |
| Will1 | In Progress | |
| Will2 | Draft Generated | |
| Will3 | To Be Signed | |
| Will4 | Completed | |

DECENTRALIZED WILL MANAGEMENT APPARATUS, SYSTEMS AND RELATED METHODS OF USE

FIELD

The present disclosure generally relates to systems and methods for secure management of legal documents, and particularly to decentralized will management systems and related methods of use.

BACKGROUND

Automated creation and administration of wills have evolved over the years. A typical will automation solution involves providing a set template for a will to a user. The template typically includes a set of prefixed legal clauses and one or more empty fields for being filled out by the user. The empty fields are usually set to receive details of assets, and those of involved parties (e.g., testator, beneficiary, executor, guardian, etc.) received from the user. The prefixed legal clauses, or template fields, are generally standardized or fixed based on a location of the assets or a country of residence of the testator. However, none of the existing solutions provide any guidance to manipulate or change the template, or any of the prefixed legal clauses therein, for improving the scope (or relevancy to the testator) of a corresponding electronic will (e-will) based on the received details. Sometimes, the template is filled out or manipulated offline by an attorney, which may result in additional operational time, costs, and more inconvenience. The filled-out template is sent to the testator for execution or signing. The testator electronically signs the template over a video session, which is established with witnesses using any of the state-of-the-art video conferencing platforms such as Skype™, Zoom™, Google Meet™, and so on, to create the e-will. These video conferencing platforms are typically separate or operate independently from the will automation solution, resulting in (i) cumbersome and inefficient tracking of the signing process or the e-will and (ii) increased operational time and costs. The video session is recorded to produce a video file, which is stored along with the e-will in a repository for future access and retrieval.

Furthermore, hash values stored in a distributed ledger are generally prone to errors, which can compromise the authenticity and reliability of data on the ledger. These errors are typically caused by a hash function collision and a hash attack, which are related to hash functions associated with the stored hash values. Hash function collisions occur when, by sheer coincidence, a system implementing a content-addressable storage contains two files with different content and yet having the same hash value, i.e., the same "content address." While this type of risk remains statistically negligible, there is substantial value in eliminating or substantially reducing a possibility of such error. On the other hand, a hash attack, also known as a "second pre-image finding," happens when a malicious entity intentionally generates a significantly modified version of a computer file, where the modified version is set to produce an output hash value (or "content address") identical to a desired hash value of the original file. Such hash attack may involve inserting a random bit pattern into a verification hash function, or the computer file, for changing the output hash value as per the desired hash value. In any case, the hash attack amounts to the "breaking" of the corresponding hash function and a destruction of the underlying digital information thought to be securely preserved. Moreover, traditional encryption methods known to generate encryption keys are susceptible to brute force attacks, or require a large key size for security that is prohibitively inefficient to store or communicate.

There is a need for an improved secure solution for creation and management of legal documents such as e-wills and related data.

SUMMARY

In some aspects, blockchain technology may maintain a reliable, authentic, and secure record of an electronic will (e-will). A hash value may be generated for a video file created by recording an execution process of the e-will. This hash value may be stored on a distributed ledger and used for verifying the video file. The hash value, or a reference to the video file, may additionally be inserted into a data record of the e-will in a database for indexing. The data record may be representative of the e-will and include a list of assets, asset types, and timestamps at which the assets are entered in the data record. The entire data record may then be encrypted to create a token, which is either an encryption key or a digital signature calculated using predetermined hash functions. The token with the timestamp and/or a hash of data associated with the asset information may then be put on a distributed ledger as a transaction record. Further, the e-will may be encrypted using an encryption or signing key, which is also inserted into the ledger. The encrypted e-will may be maintained in a private database and the ledger may contain the associated tokens and keys, in some aspects.

Various aspects of the present disclosure describe a decentralized will management (DWM) system including a processor and a memory. The memory described herein may comprise non-transitory memory that contains computer-executable instructions for execution by the processors described herein for carrying out the method steps described herein. Aspects may be implemented using one or more modules, e.g., an input engine, a legal engine, a blockchain manager, an analytics engine, and a promotions engine, communicatively coupled to the processor and the memory. One aspect of the present disclosure includes a method implemented by the DWM system for creating and managing an electronic will. The method may include (1) registering, using the input engine, a host node, a service node, and at least one remote node connected to the DWM system via a network, wherein the host node may be related to a role of an attorney, the service node may be related to a role of a testator, and the at least one remote node may be related to a role of a witness designated by the testator or the attorney; (2) receiving, using the input engine, attorney data from the host node and input data from the service node, the input data including details of parties, asset details, and asset allocation details for creating the electronic will, wherein the parties include the testator, one or more witnesses, one or more beneficiaries, and an executor; (3) accessing, using the legal engine, a predetermined list of legal clauses related to electronic wills; (4) selecting, using the legal engine, one or more legal clauses from the list to provide a first set of clauses, the one or more legal clauses being selected based on at least one of (i) relative locations of the parties with respect to a testator location, (ii) an asset location and (iii) a will type relevant for the testator determined based on the input data, wherein the first set of clauses includes the selected one or more legal clauses pertaining to one or more clause types; (5) deselecting, using the legal engine, a legal clause from the first set of clauses to provide a second set of clauses, the legal clause being deselected based on at least one of a predefined criterion and a predetermined document length for the electronic will, wherein the second set of clauses includes at least one legal clause of each of the one or more clause types; and (6) generating, using the legal engine, a will template for creating the electronic will, the will template being generated for the service node, wherein the will template may be generated based on one of the first set of clauses and the second set of clauses.

Other aspects of the present disclosure may include (a) initiating, using the legal engine, a video session between the host node, the service node, and the at least one remote node, wherein the will template may be signed by the testator on the service node during the video session to generate the electronic will; (b) receiving, using the legal engine, a first input from the service node, a second input from the host node and a third input from the remote node during the video session, wherein the first input indicates signing of the will template, the second input indicates a presence of a first user on the host node, and the third input indicates a presence of a second user on the remote node, and wherein (1) the first input, the second input, and the third input may be received in any order and (2) the first input includes a first timestamp at which the first input may be received; (c) recording, using the legal engine, the video session for a predetermined duration, wherein the recorded video session may be converted into a video file including a second timestamp at which the video file may be created or received; (d) validating, using the legal engine, the electronic will and the video file based on a validation input from the host node, wherein the validated electronic will may be converted into a will document having a predetermined file format; (e) calculating, using the blockchain manager, a first hash value for the will document and a second hash value for the video file, the first hash value being calculated based on a predetermined first hash function and the second hash value being calculated based on a predetermined second hash function, wherein the first hash function may be based on metadata and data of the will document and the second hash function may be based on metadata and data of the video file; (f) modifying, using the blockchain manager, a copy of the first hash value or the first hash function based on the second hash function and/or the metadata of the video file to provide a modified hash value for the will document; (g) creating, using the blockchain manager, a data block in a distributed ledger, the data block including the modified hash value, the second hash value, the first timestamp, and the second timestamp; (h) updating, using the blockchain manager, a data structure of the distributed ledger to include a new data block based on a change in the electronic will or related data, wherein the new data block includes at least one new hash value and a related timestamp corresponding to the changed electronic will and a link to the last-created data block; (i) providing, using the analytics engine, a predetermined output to a requesting node including one of the host node and the service node, the predetermined output including one or more visualizations, recommendations, and updates, wherein the predetermined output may be provided based on the input data, the attorney data, and a role associated with the requesting node; and (j) providing, using the promotions engine, a notification to a network node including one of the host node and the service node, the notification including at least one of messages, alerts, reminders, social media feeds, and advertisements, wherein the notification may be provided based on the attorney data and a role associated with the network node.

In another aspect, there is provided a computer-implemented method of creating or managing legal documents, the method comprising: providing a decentralized legal document management (DWM) system including a non-transitory computer-readable decentralized data storage (DDS), a distributed ledger and at least one node, the DDS, the distributed ledger and the at least one node communicatively coupled to each other over a network, the at least one node each including at least one processor communicatively coupled to interfaces and a local and/or remote non-transitory computer-readable medium including instructions executable by the respective at least one processor, the at least one node including: at least one host node, each said at least one host node associated with a legal service provider; at least one service node, each said at least one service node associated with an entity seeking legal service; and at least one processing node, each said at least one processing node further comprising an input engine for prompting for and/or receiving input, a legal engine, and a blockchain manager, each of the input engine, the legal engine and the blockchain manager communicatively coupled to the at least one processor of the respective processing node; receiving, using the input engine, input data over the network from the at least one host node and/or the at least one service node, the input data including at least a legal service to be provided to the at least one service node; generating, using the legal engine, at least one legal clause and/or at least one legal document from a predetermined list of legal clause(s) and/or legal document(s), based on the received input data; and storing the reviewed at least one legal clause and/or at least one legal document in the DDS, the DDS accessible by the at least one host node and the at least one service node over the network.

In a further aspect, there is provided a processing node for creating or managing legal documents, the processing node comprising an input engine for prompting for and/or receiving input, a legal engine, a blockchain manager, interface(s), a local and/or remote non-transitory computer-readable medium, and at least one processor, the at least one processor communicatively coupled to the interface(s), the local and/or remote non-transitory computer-readable medium, the input engine, the legal engine, and the blockchain manager; the local and/or remote non-transitory computer-readable medium including instructions executable by the at least one processor to: receive, using the input engine, input data over a network from at least one host node and/or at least one service node, the at least one host node associated with a legal service provider and the at least one service node associated with an entity seeking legal service, the input data including at least a legal service to be provided to the at least one service node; generate, using the legal engine, at least one legal clause and/or at least one legal document from a predetermined list of legal clause(s) and/or legal document(s), based on the received input data; and store the at least one legal clause and/or at least one legal document in a decentralized data storage (DDS), the DDS accessible by the processing node, the at least one host node and the at least one service node over the network.

In yet another aspect, there is provided a computer-implemented method of creating or managing legal documents, the method comprising: providing a decentralized legal document management (DWM) system including a non-transitory computer-readable decentralized data storage (DDS), a distributed ledger and at least one node, the DDS, the distributed ledger and the at least one node communicatively coupled to each other over a network, the at least one node each including at least one processor communicatively coupled to interfaces and a local and/or remote non-transitory computer-readable medium including instructions executable by the respective at least one processor, the at least one node including: at least one host node, each said at least one host node associated with a legal service provider; at least one service node, each said at least one service node associated with an entity seeking legal service; and at least one processing node, each said at least one processing node further comprising an input engine for prompting for and/or receiving input, a legal engine, and a blockchain manager, each of the input engine, the legal engine and the blockchain manager communicatively coupled to the at least one processor of the respective at least one processing node; receiving, using the input engine, input data over the network from the at least one host node and/or the at least one service node, the input data including at least a legal service to be provided to the at least one service node; generating, using the legal engine, at least one legal clause and/or at least one legal document from a predetermined list of legal clause(s) and/or legal document(s), based on the received input data; storing the at least one legal clause and/or at least one legal document in the DDS, the DDS accessible by the at least one host node and the at least one service node over the network; calculating, using the blockchain manager, a first hash value for a will document derived from the at least one legal clause and/or at least one legal document, and a second hash value for a video file derived from a digital video recording of a signing, or signing and witnessing, of the will document, the first hash value being calculated based on a predetermined first hash function and the second hash value being calculated based on a predetermined second hash function, wherein the first hash function is based on metadata and data of the will document and the second hash function is based on metadata and data of the video file; modifying, using the blockchain manager a copy of the first hash value or the first hash function to provide a modified hash value for the will document; and creating, using the blockchain manager, a data block in the distributed ledger, the data block based at least on the modified hash value.

BRIEF DESCRIPTION OF DRAWINGS

The following description is intended only by way of example, and simply illustrates certain example aspects of systems and methods that are consistent with the subject matter disclosed herein. For a better understanding of the various aspects described herein and to show more clearly how they may be carried into effect, reference will now be made, by way of example only, to the accompanying drawings in which:

FIGS. 4-9 depict example interface screens for a node in the DWM system of FIG. 1, according to aspects of the present disclosure;

DESCRIPTION

Figure 1:
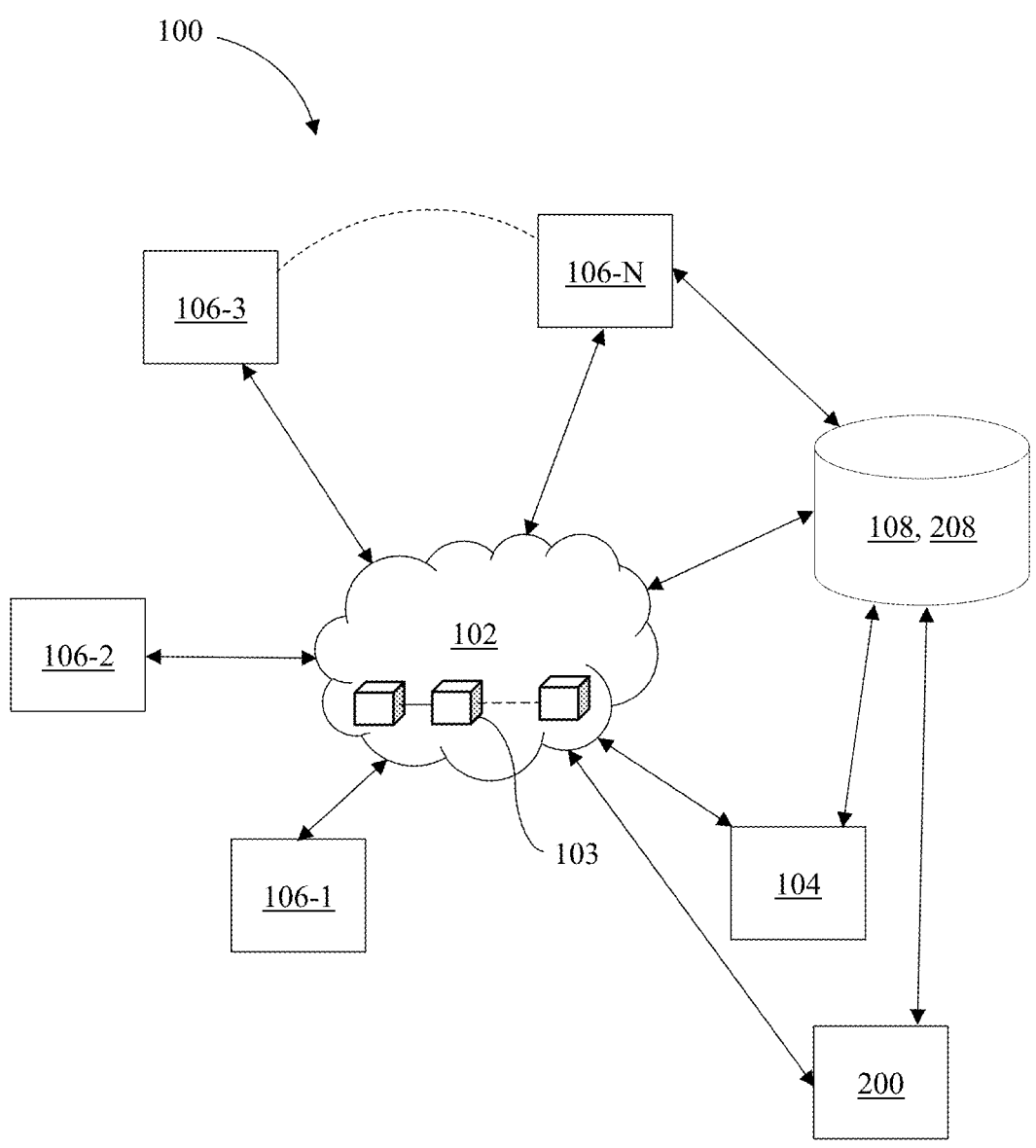
FIG. 1 depicts a schematic diagram of a blockchain-based decentralized will management (DWM) system, according to an aspect of the present disclosure.

The following detailed description is provided with reference to the drawings herein. Example aspects are provided as illustrative examples so as to enable those skilled in the art to practice the disclosure. It will be appreciated that further variations of the concepts and aspects disclosed herein are contemplated and are within the scope of the present disclosure. The examples of the present disclosure described herein may be used together in different combinations. In the following description, details are set forth in order to provide an understanding of the present disclosure. It will be readily apparent, however, that the present disclosure may be practiced without limitation to any of these details. Also, throughout the present disclosure, the terms "a" and "an" are intended to denote at least one of a particular element. The terms "a" and "an" may also denote more than one of a particular element. Additionally, the term "comprising" and its derivatives, as used herein, are intended to be open-ended terms that specify the presence of the stated features, elements, components, groups, integers, and/or steps, but do not exclude the presence of other unstated features, elements, components, groups, integers, and/or steps (and the foregoing also applies to words having similar meanings, such as the terms "including", "having" and their derivatives). The term "based on" means based at least in part on, the term "based upon" means based at least in part upon, and the term "such as" means such as but not limited to. The term "approximately" means a variation of +/−5% in a stated parameter or a value of a stated parameter. Further, in the present disclosure, an aspect showing a singular component should not be considered limiting; rather, the present disclosure is intended to encompass other aspects including a plurality of the same or similar component, and vice versa, unless explicitly stated otherwise herein. The present disclosure also encompasses present and future known equivalents of the components referred to herein.

Examples of one or more terms that will be used in the present disclosure are described below, without limitation. The person skilled in the art would understand that the below examples are provided for the sake of clarity, and that the terms below are intended to encompass more than just the examples provided within this detailed description.

"Computer process" and "process" are used interchangeably in the present disclosure in the context of its broadest definition. The computer process may refer to the performance of a described function in a computer using computer hardware (such as a processor, field-programmable gate array or other electronic combinatorial logic, or similar device), which may be operating under control of software or firmware or a combination of any of these or operating outside control of any of the foregoing. In using the term "computer process" may not necessarily require a schedulable entity, or operation of a computer program or a part thereof, although, in some aspects, a computer process may be implemented by such a schedulable entity, or operation of a computer program or a part thereof. Furthermore, in some examples, a "process" may be implemented using more than one processor or more than one (single- or multi-processor) computer. The "computer process" or "process" can be implemented in any suitable computing environment such as, but not limited to, a cloud computing network and a decentralized computing network.

A "computing device" is used in the present disclosure in the context of its broadest definition. A computing device may refer to a processor or hardware including a processor. Examples of a computing device may include, but are not limited to, a desktop computer, a laptop computer, a mobile phone or smartphone, and a server. In some examples, the computing device may operate, or be configured to operate, as a proxy device forming a bridge between another computing device and a data storage device or a data storage system.

A "node" is used in the present disclosure in the context of its broadest definition. The node may refer to a single entity or a collection of multiple entities configurable to perform an intended function. The collection may include the same or different types of entities. Examples of such entities may include, but are not limited to, a computing device, a computer-readable medium, a storage unit, or a combination thereof.

A "file" is used in the present disclosure in the context of its broadest definition. The file may refer to a computer-readable electronic file and related data in a variety of formats supporting storage, printing, use, or transfer of the file and related data over a communication channel. The file may be usable or configurable for being used by predefined or dynamically defined software applications. In some examples, the file may pertain to a legal document or matter.

A "document" is used in the present disclosure in the context of its broadest definition. The document may refer to an electronic document including a single page or multiple pages. In some aspects, any of the pages may include text, images, embedded audio files, embedded videos, embedded data files, links to any of the foregoing that are accessible remotely from the document, such as digitally accessible over a network, or any combinations thereof. In one example, the document may represent a type of the file.

A "user" is used in the present disclosure within the context of its broadest definition. The user may refer to an artificial intelligence (AI) engine, or a person being assigned access to or a privilege on the node or the AI engine.

A "role" is used in the present disclosure within the context of its broadest definition. The role may refer to a named grouping of one or more permissions assigned to the user or the node. Examples of the role may include, but are not limited to, attorney, testator, witness, guardian, executor, and beneficiary. In some instances, a role may additionally correspond to a user.

A "template" is used in the present disclosure in the context of its broadest definition. The template may refer to a complete version of a file, or an incomplete version of a file including a certain percentage of data relevant to the corresponding file type or document type, user, role, node, or any combinations thereof, such as, by way of example only, at least approximately 30% of such data.

Example Aspects

Aspects are disclosed herein in the context of creation and management of an electronic will using a distributed computing network. However, aspects and concepts disclosed herein can be applied for creation and management of any other types of legal documents including, but not limited to, power of attorney (POA), affidavits, contracts, and deeds. The presently described aspects may be implemented using a centralized computing network either independently or in combination with the distributed computing network. In the present disclosure, the terms "distributed" and "decentralized" are used interchangeably; however, one having ordinary skill in the art would understand that aspects disclosed herein, including any future variations thereof, may leverage any of the common and respective unique aspects of distributed computing networks and decentralized computing networks for implementing the concepts disclosed herein.

FIG. 1 depicts a blockchain-based decentralized will management (DWM) system 100, according to an aspect of the present disclosure. In the illustrated aspect, the DWM system 100 may provide or include a distributed computing network. The DWM system 100 includes network nodes 104, 106 connected to a network 102 (e.g., the Internet, wired or wireless telephone networks, private or public networks, etc.). The network 102 may include any software, hardware, or computer applications capable of providing a medium to exchange signals and data. The system 100, in some aspects, may comprise or include any suitable distributed ledger system 103 (which may comprise, e.g., a blockchain or a directed acyclic graph (DAG)) based on intended functionalities for the DWM system 100 described herein. The distributed ledger 103 is shown in FIG. 1 as being accessible via the network 102. Some aspects of the network 102, or such distributed ledgers 103, may be platform-agnostic to further support compatibility and integrability with the DWM system 100. Examples of the distributed ledger platforms 103 may include, but are not limited to, Polkadot™, Solana™ and StampD™.

The network nodes may include at least one host node 104 and at least one service node 106 (referenced as 106-1, 106-2, 106-3 . . . 106-N in FIG. 1, but hereinafter collectively referred to as service nodes 106). Each of the host node(s) 104 and the service node(s) 106 may be connected to the network 102 in a distributed peer-to-peer architecture, and include a processor, a memory and any suitable software interfaces and hardware interfaces such as an input/output (I/O) interface and a network interface, as described further below. In some example aspects, the DWM system 100 may also include a data storage 108 (which may comprise a decentralized data storage (DDS) system accessible by one or more of the network nodes such as the host node(s) 104 and/or the service node(s) 106, such as via the network 102. As used herein, "DDS system" includes a stand alone data storage 108 and/or a decentralized data storage (DDS) system 108 which may include a group of one or more network nodes such as, but not limited to, computing devices, computer readable media, portable storage devices, or any combinations thereof. The DWM system 100 either independently or in combination with the DDS system 108 may implement InterPlanetary File System (IPFS) for storing and accessing files, websites, applications, and data in the distributed computing network. Other examples may include any other types of communication protocols now known in the art or later developed, either alone or in any suitable combinations, being implemented for accessing and storing data in a distributed computing system. In some examples, the DDS system 108 may also include a centralized data storage system such as a centralized cloud storage. Each of the host node(s) 104, the service node(s) 106, and the DDS system 108 may communicate with each other on a peer-to-peer basis via the network 102. In some aspects, the DWM system 100 may also use permissioned blockchain or multichain solutions for the purposes of the distributed ledger 103 and the decentralized data storage 108.

In some aspects, the DWM system 100 may include, wholly or in part, a software application working alone or in conjunction with one or more hardware resources. Such software application may be executed by any of the intended network nodes (e.g., host node 104), or respective one or more processors associated therewith, on different hardware platforms or emulated in a virtual environment. Aspects of the DWM system 100 may leverage known or later developed off-the-shelf software. In further aspects, the DWM system 100 may implement a stack of one or more supporting decentralized applications (or "Dapps") for one or more tasks. A Dapp may include a software service linked to any suitable application programming interface (API) to access and execute stored program or application code (e.g., smart contract, will creation code, will security code, wallet management, identity management, role management, public or private key management, etc.) created according to a predetermined or customized configuration based on concepts disclosed in the present disclosure. In one example, the Dapp may assist in configuring one of the service nodes 106 to operate as a Dapp-enabled host node, or vice versa. This Dapp, in one instance, may be deployed as a transaction and installed, via appending to a distributed ledger, on an intended service node. Such Dapp-enabled host node may operate independently or in tandem with the host node 104. The Dapp may also enable the corresponding service node to maintain its own state, control related attributes, and receive external information via the network 102.

Figure 10:
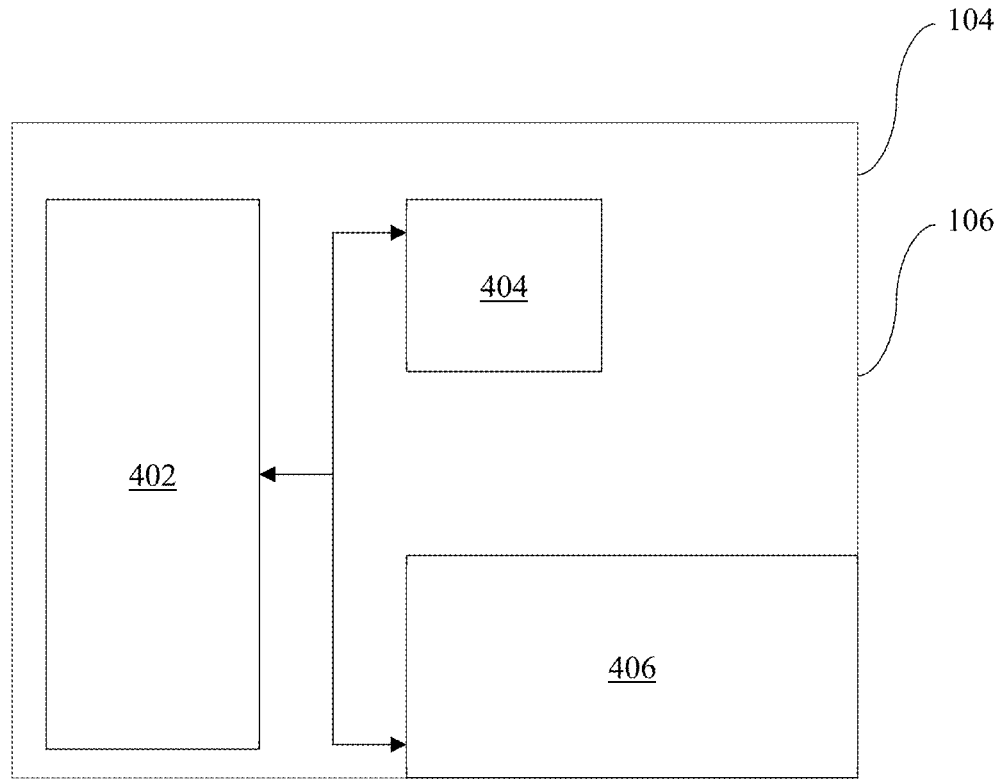
FIG. 10 depicts a schematic diagram of an example node in the DWM system of FIG. 1, according to an aspect of the present disclosure.

With reference to FIG. 10, any of the nodes 104, 106 and/or the DDS system 108 (which itself may be referred to as a node) may include one or more node processors 402 communicatively coupled to a node memory 404 and node interfaces 406. The nodes 104, 106 may communicate with other nodes 104, 106, 200, including the data storage 208 (such as the DDS system 108), over a network 102 via the interfaces 406, and the memory 404 of the host node(s) 104, the service node(s) 106 and the processing node(s) 200 (described below) may comprise non-transitory computer-readable mediums comprising instructions executable by the processor(s) 202, 402 for carrying out any of the method steps described herein suitable for execution by the respective node(s) 104, 106, 200.

Figure 2:
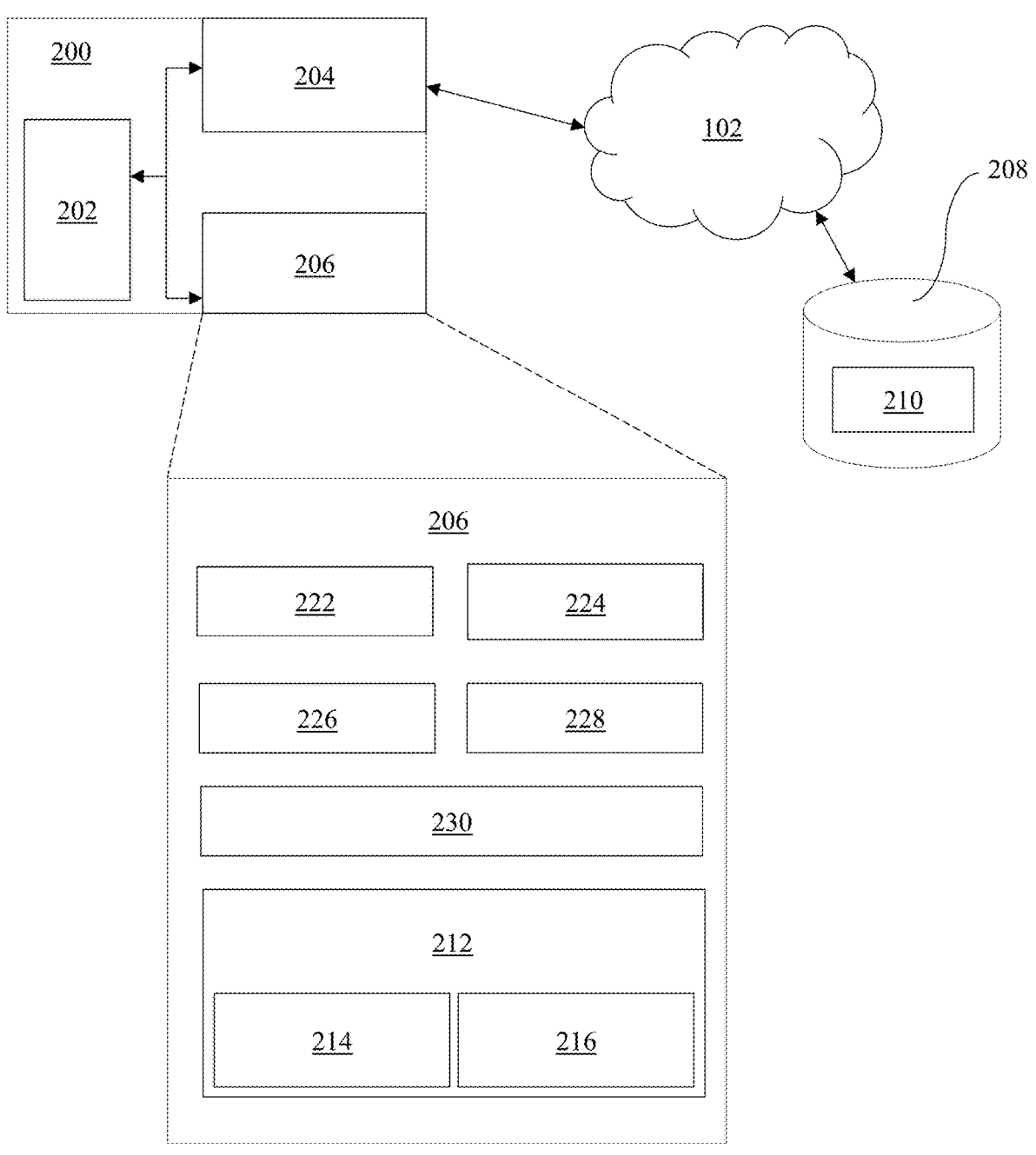
FIG. 2 depicts a block diagram of a processing node in the DWM system of FIG. 1, in communication with a network and external data storage, according to an aspect of the present disclosure.

FIG. 2 depicts a block diagram of a processing node 200 in the DWM system 100 of FIG. 1, according to an aspect of the present disclosure. The processing node 200 may include or be configured to operate as a network node 104, 106 in the DWM system 100. The processing node 200 may be implemented by way of a single device or a combination of multiple devices that may be operatively connected or networked together. The processing node 200 may be integrated with or include one or more of the network nodes such as the host node(s) 104 and/or the service node(s) 106. However, in some examples, the processing node 200 may be an independent and standalone node connected to the DWM system 100 via the network 102. Other examples may include the processing node 200 being configured to operate in tandem with other network nodes. For instance, one of the service nodes 106 and/or the host node 104 may invoke the processing node 200 as a service to perform one or more operations including, but not limited to, reading, writing, creating, deleting, indexing, segmenting, labeling, extracting, updating, and/or manipulating files and/or data, including metadata, and communicate the resultant data to one or more network nodes 104, 106. In one aspect, the processing node 200 may include one or more processors 202, interfaces 204, and a memory 206. The processing node 200 and the nodes 104, 106 may include any suitable types of interfaces 204, 406 known in the art or later developed, including software interfaces (e.g., application programming interfaces (APIs), graphical user interfaces, etc.) and hardware interfaces (e.g., communication interfaces such as cable connectors and network interface cards, and input/output interfaces such as a keyboard, card reader, barcode reader, biometric scanner, interactive display screen, monitor, touch screen, etc.). The processing node 200 or the processor 202 may use the interfaces 204 to communicate with other nodes 104, 106 of the DWM system 100, including the DDS system 108 (which in some aspects is an example of the external data storage 208).

The interfaces 204, 406 may include an input/output (I/O) interface and/or a network interface. The I/O interface may include any controller card, such as a universal asynchronous receiver/transmitter (UART) used in conjunction with a standard I/O interface protocol such as RS-232 and/or Universal Serial Bus (USB). The network interface may operate in tandem with the I/O interface and may include a network interface card supporting Ethernet® and/or Wi-Fi® and/or any number of other physical and/or datalink protocols including those for cellular networks. For example, any of the network nodes such as the processing node 200 (e.g., a smart phone) upon being connected to a wireless data network may also participate in both cellular and unlicensed wireless communications (e.g., Wi-Fi®) to communicate with other network nodes such as the host node(s) 104 and the services node(s) 106 in the DWM system 100. In further aspects, the interfaces 204 may additionally include any suitable types of APIs known in the art including, but not limited to, those corresponding to Simple Object Access Protocol (SOAP), Remote Procedure Call (RPC) protocol and Representational State Transfer (REST) protocol.

Further, the processor(s) 202, 402 may be configured to fetch, process, and/or execute machine readable instructions and/or data stored in the memory 206, 404 which may include any suitable non-transitory computer-readable medium known in the art. For example, any of the memory described herein, including memory 206, 404, may comprise any suitable form of non-transitory computer-readable storage medium for storing computer-executable instructions for execution by any of the processors 202, 402 described herein to carry out any of the method steps or other actions described herein, and further to store any of the information or data described herein that is required by the described methods or other actions, or otherwise capable of, storage in memory. The memory 206, 404 may comprise, e.g., one or more of a local and/or remotely accessible (such as over the network 102) hard disk or hard drive, of any type, ROM (read-only memory) and/or RAM (random-access memory), buffer(s), register(s), cache(s), removable disk(s), flash memory, compact disk(s), programmable memory (PROM), EPROM, EEPROM, optical memory (e.g., CD(s) and DVD(s)), and any other form of volatile or non-volatile storage medium in or on which information may be stored for any duration, and any suitable combination thereof. The processors 202, 402 and the associated memories 206, 404 may be co-located on respective circuits, separate components connected by appropriate electrical cable connections for effecting the appropriate communications protocols, and/or remotely connected via the network 102.

Further, the processing node 200 may also be configured to communicate with an external data storage 208 via a network, such as network 102. The external data storage 208 may include a computer readable medium such as those described above. The external data storage 208 may store machine executable instructions and/or data being accessible by the processor(s) 202 to carry out one or more tasks or method steps described herein. In some examples, the external data storage 208 may include or be connected to the DDS system 108 via the network 102. In some other examples, the external data storage 208 may include at least one of a cloud storage (not shown), the host node(s) 104, and a group of one or more of the service nodes 106. The external data storage 208 may be used in combination with the memory 206 by the processing node 200. For instance, in one aspect, the external data storage 208 may include a vault 210 for storing active, or a latest version of, electronic files and related data including metadata. Other instances may include the vault 210, wholly or in-part, being located in a host node 104. The memory 206 may include one or more databases such as a database 212, which may be sub-divided into one or more sections for storing electronic files and data including metadata. For example, the database 212 may include an archive 214 and a data store 216 for storing electronic files and/or data. In contrast to the vault 210, the archive 214 may be used to store inactive or older versions of files and related data including metadata. On the other hand, the data store 216 may be used to store, at least one of, (i) a log of profiles of the network nodes, users, roles, and associated communications including instructions, queries, data, and related metadata, (ii) a list of one or more will types, (iii) a predetermined list of legal clauses and related clause types, and (iv) one or more rules for creating, indexing, segmenting, labeling, extracting, updating, and/or manipulating at least one of the (a) list of will types, (b) legal clauses or a list thereof, and (c) legal documents (e.g., wills, POA, etc.) or templates related thereto. Further, the database 212 may have a relational database schema; however, other suitable types of database schemas may also be contemplated including non-relational databases known in the art such as, but not limited to, DynamoDB™, MongoDB™, and Apache HBase™. In some examples, the database 212 may be, wholly or in-part, located on the external data storage 208 (e.g., a cloud storage, the DDS system 108, etc.) connected to the processing node 200 via the network 102.

In one aspect, as illustrated in FIG. 2, the memory 206 may include one or more modules, e.g., one or more of an input engine 222, a legal engine 224, a blockchain manager 226, an analytics engine 228, and a promotions engine 230. Some aspects may include one or more of these modules being hosted on a cloud computing platform (not shown), such as on a virtual machine (not shown) implemented via a cloud computing platform (not shown) connected to the DWM system 100. The processing node 200 may invoke the virtual machine, or the respective one or more modules hosted thereon, to carry out the corresponding functionalities; however, in some example aspects, the processing node 200 may itself include or be implemented as the virtual machine. The cloud computing platform may include a plurality of disaggregated servers, which may provide functionalities of the virtual machine including a virtual application server and a virtual (or cloud) storage/database. The disaggregated servers may include physical computer servers having components such as a processor, a memory, an I/O interface and/or a network interface. The features and variations of these components may be substantially similar to those described above for the processing node 200; however, these components may differ where the disaggregated servers may be optimized for throughput and/or for disaggregation. In some examples, one or more of these disaggregated servers may additionally host, wholly or in-part, the database 212 including the application code, network software, deployment software, and so on. Further, the cloud computing platform may be made accessible to the network nodes (such as the host node(s) 104, the service node(s) 106, and the processing node(s) 200) via an integrated cloud infrastructure (not shown) known in the art. The cloud infrastructure may provide access to cloud services including, but not limited to, distributed ledger services, tokenization services, and billing services. The cloud infrastructure may also assist in additional service abstractions such as Platform as a Service ("PAAS"), Infrastructure as a Service ("IAAS") and Software as a Service ("SAAS") (for example, one or more of the input engine 222, legal engine 224, blockchain manager 226, analytics engine 228, and promotions engine 230 may be provided as SaaS).

The input engine 222 may be configured to, at least one of (and not limited to): (1) register users or network nodes 104, 106 or any other nodes on the DWM system 100, (2) activate or assign a role to one or more of the registered users or nodes, (3) send/receive files (e.g., questionnaire, existing will document, identity document, etc.) and data including metadata to/from the network nodes, (4) auto-populate various fields in the dashboard or graphical user interface (GUI) 223/database 212 based on received data (e.g., through a completed questionnaire), (5) initiate, monitor, and/or terminate a predefined or dynamically defined process or operation, (6) create, manage, and/or terminate a digital wallet (e.g., a centralized or local wallet, a decentralized or remote wallet, a document wallet, a token wallet, or a combination thereof), (7) invoke or enable access to one or more components/modules (e.g., database 216) of the processing node 200 and/or other network nodes connected thereto, and (8) handle one or more legal documents, or types thereof. Examples of these legal document types include, but are not limited to, wills, power of attorney (POA), contracts, and deeds. The input engine 222 may communicate files and data including related metadata to (i) the legal engine 224 for processing, or (ii) a data repository such as the data store 216 connected to the processing node 200.

The legal engine 224 may be set up based on a rules-based artificial intelligence (AI) engine or a machine learning (ML)-based engine. The legal engine 224 may be configured to, at least one of (and not limited to): (1) receive input data from the input engine 222, (2) parse or analyze the input data, (3) create, access, and/or update a list of legal clauses, (4) collate one or more legal clauses under one or more types or categories based on clause text and/or legal document types, (5) select or deselect a set of one or more legal clauses from the list, e.g., based on the parsed or analyzed input data, (6) provide a relevant set of legal clauses, e.g., based on a selected or deselected set of legal clauses, where the relevance may be determined based on an intended legal document or aspects thereof such as, but not limited to, legal document type, document length, jurisdictional coverage, related asset types, one or more asset locations, and one or more relative locations of involved parties, (7) create, access, and/or update a legal document, or a template thereof, e.g., based on the relevant set of legal clauses, (8) initiate preset or dynamically set one or more processes/operations/modes related to the legal document, and (9) provide a dashboard, or an interface screen, to access and/or control one or more functionalities assigned to or of the network nodes such as the host node 104, the service node 106, and the processing node 200. The processes/operations/modes, in some aspects, may depend on a legal document type including those mentioned above. In some aspects, multiple processes/operations/modes may be initiated by the legal engine 224 at or after set intervals, or concurrently. Other examples may include the legal engine 224 being set up to trigger a predetermined process/operation/mode upon completion of a milestone reached of another process/operation/mode.

The blockchain manager 226 may be configured to, at least one of (and not limited to): (1) determine at least one hash value for a predetermined legal document/file and related data based on one or more predetermined hash functions, (2) calculate a hash value based on (i) a single hash function or (ii) a combination of multiple predetermined hash values and/or related hash functions, (3) create a new data block in a predefined or dynamically defined blockchain based on a single consensus protocol or a combination of multiple predetermined consensus protocols, (4) execute the one or more consensus protocols based on one or more predefined users, roles, and/or nodes, (5) put the calculated hash value(s) on the created data block and a copy thereof in the database 212, (6) store an active or a latest version of the legal document/file, which may be related to a calculated hash value, in the vault 210, (7) store an inactive or an older version of the legal document/file in the archive 214, (8) encrypt a legal document using any suitable encryption algorithms known in the art, (9) select, deselect, and/or fork a predefined blockchain based on a type of the legal document and/or predetermined users, roles, or nodes, and (10) assist in verifying the legal document/file based on the predetermined hash functions and the predetermined hash values stored on the most recent data block of the blockchain. As used herein, "blockchain manager" does not necessarily denote a distributed ledger that is a blockchain; rather, the blockchain manager 226 may be used with any type of decentralized or centralized distributed ledger, including those that employ or do not employ blockchains. Further, the term "blockchain" as used herein may refer to any such distributed ledger 103, including those not employing a blockchain.

The analytics engine 228 may be configured to, at least one of (and not limited to): (1) analyze the input data to generate visualizations based on (i) a predetermined user, role, or node, (ii) the legal document or a type thereof, and (iii) usages of or interactions with a set node (e.g., the host node(s) 104, one or more service nodes 106, etc.), the DWM system 100, the external data storage 208, and/or the network 102, (2) collate data including metadata related to the visualizations, (3) communicate the visualizations and/or related data including metadata to a connected network node, (4) display the visualizations on a connected display device, and (5) provide recommendations or updates based on (i) the input data, (ii) the legal document and/or related data, and/or (iii) predetermined users, roles, or nodes. Further, the promotions engine 230 may be configured to, at least one of (and not limited to): (1) provide messages, alerts, reminders, feeds, and/or advertisements based on predetermined users, roles, or nodes, and (2) create a service marketplace based on the registered users and/or roles.

Example Operation

Figure 3A:
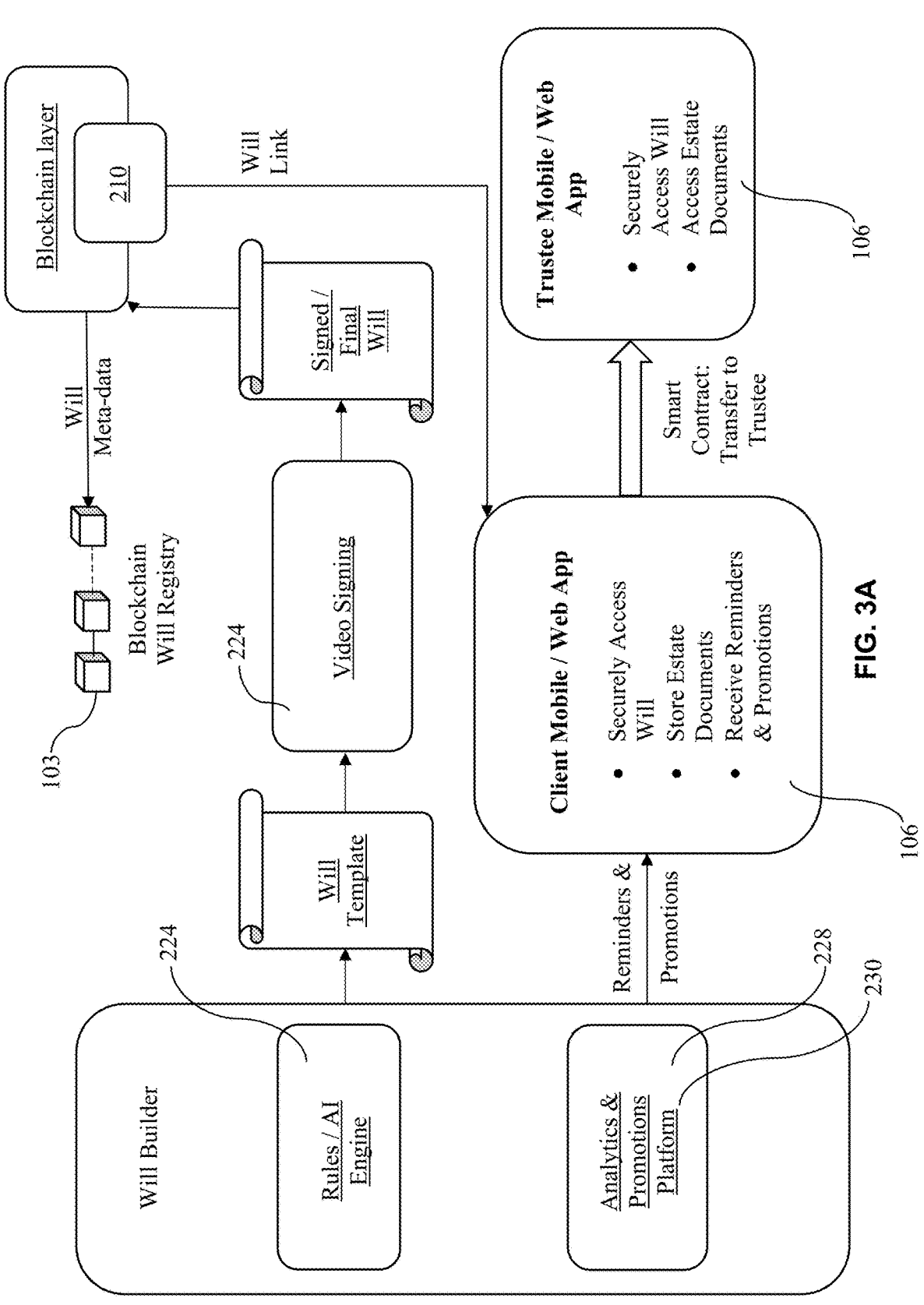
FIGS. 3A and 3B depict example processes for implementing the DWM system of FIG. 1, according to aspects of the present disclosure.

FIG. 3A illustrates an example computer process for implementing the DWM system of FIG. 1, according to an aspect of the present disclosure. The DWM system 100 may be configured to create and manage legal documents such as wills and related data including metadata. For example, a user may register on the DWM system 100, via the input engine 222, using one of the network nodes. Upon registration, the input engine 222 may assign login credentials to the user. Based on information received for registration, or the assigned login credentials, the DWM system 100, e.g., via the input engine 222 or processors connected thereto, may assign predefined roles to the user and/or a corresponding network node used for registration. For instance, a user, or the corresponding network node used for registration, may be (i) assigned a role, e.g., "third-party entity" based on details received for registration and (ii) recorded as a service node, such as a registry node 106, in the DWM system 100. The role "third-party entity" and/or the registry node may be associated with a user or an entity based on the registration details received therefrom. Examples of the entity may include, but are not limited to, a corporation or a user group, a government authority (e.g., wills registry department, marriage registry department, coroner's office, etc.), an investigation authority (e.g., state police department, tax department, etc.), a financial institution (e.g., banks, credit unions, etc.), a legal authority (e.g., courts, office of notary public, etc.), an insurance provider, and so on. The assigned role, e.g., "third-party entity", may grant permissions to the registry node for performing a variety of predetermined operations including, for example (and not limited to): (1) access/look-up, send, and/or receive legal documents, and related files and data, either locally to/from a network node or via the input engine 222, (2) verify the authenticity of the received legal documents, or files, e.g., using the blockchain manager 226, and (3) perform an action based on the verification. Examples of the action may include, but are not limited to: (i) sending a message to a network node such as a host node 104, (ii) signing or acknowledging a legal document such as an e-will, e.g., for an official or governmental registration or authentication, and (iii) associating an attribute with the legal document. Examples of the attribute may include, but are not limited to, a name, an address, a timestamp, a comment or string, a digital signature or a hash value, an official seal, a digital certificate, a digital watermark, a number, a character, and a symbol, or any combinations thereof. In one example, the registry node may invoke the blockchain manager 226 as a service for verifying the received legal documents or files based on the predetermined hash functions and the predetermined hash values stored on the most recent data block of the distributed ledger 103. Similarly, a user, or the corresponding network node used for registration, may be assigned a role, such as "attorney" and/or "law firm" or "legal service provider", based on details received for registration from a network node, which may be recorded as a host node 104 by the input engine 222 in the DWM system 100. In another aspect, the DWM system 100, or the input engine 222, may record or register any network node, where login credentials of an attorney may be entered, as a host node 104. Other aspects may include any network node used to login by an attorney for the first-time, or within a predetermined period or intervals, may be set as a host node 104 in the DWM system 100. In some examples, the host node 104 may also operate, at least in-part, as a server, or vice versa.

The assigned role, namely, "attorney", may grant access rights to the host node 104 for performing a variety of predetermined operations including, but not limited to: (1) legal document and client/user information management, (2) creation and assignment of data related to the legal document and/or the client/user, (3) processing and securing the legal document and related data including metadata for analyses, reporting, display, and export to at least one of the database 212, the vault 210, and a predefined or dynamically defined blockchain, (4) user, node, and role (e.g., case roles, system roles, etc.) information management, (5) subscription and/or billing management based on various schemes such as per legal document, per client, per user access, per role, per node or per group of nodes, per set duration (e.g., month, annual, etc.), (6) assigning another associated attorney a host node 106 to interact with the client/user on the law firm's or legal service provider's behalf, and so on. Similarly, other roles may also be assigned that may provide access rights to one or more registered network nodes for performing various operations in the DWM system 100, as discussed in the present disclosure.

Figure 4:
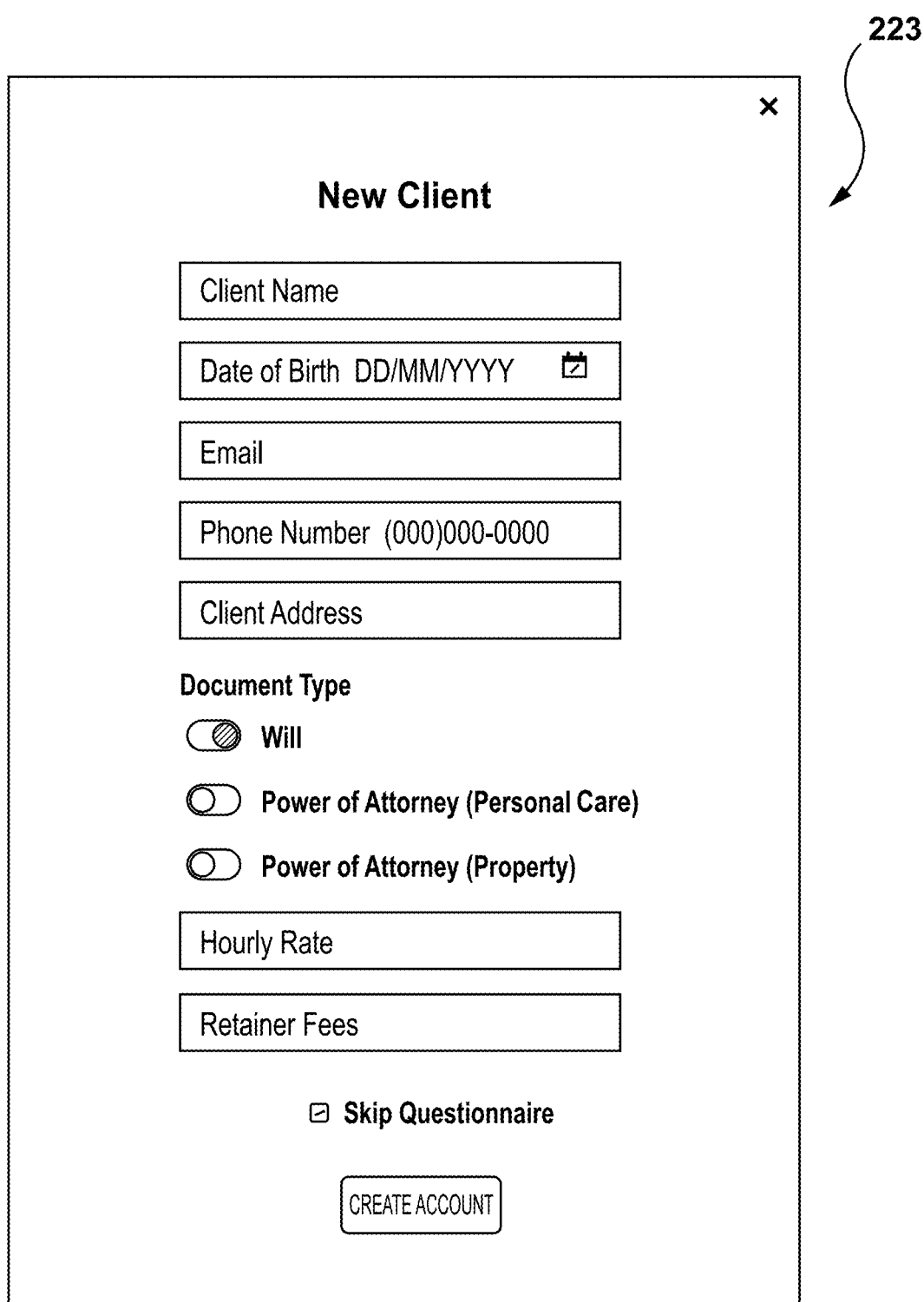

Further, in the DWM system 100, for example, the input engine 222 or processors 202, 402 connected thereto, may provide a dashboard 223, or interface screens, on a display device connected to a network node such as a host node 104, one of the service nodes 106, and/or a registry node. The dashboard, or interface screens, may provide access and/or control to one or more functionalities of the DWM system 100 based on registered nodes and the respective assigned roles. For instance, as illustrated in FIG. 4, the input engine 222, e.g., through a dashboard 223, may enable the attorney or the host node 104 to create a new client, create an associate attorney, assign an associate attorney to a client record, associate a primary attorney data (e.g., name, contact information, retainer fees, hourly rate, location, etc.), and select one or more legal document types (e.g., wills, POA, etc.) to be associated with that client. Each selected legal document type may cause the input engine 222 to initiate a new workflow or process in the DWM system 100. In some examples, a digital wallet for the new client may also be created on the corresponding service node by the input engine 222 at this time. However, other examples may include the digital wallet, or a copy thereof, being created on demand by a corresponding registered service node 106 of the new client. Once the new client is created, in some instances, the input engine 222 may tag the primary attorney data and/or the host node 104 with that client. The host node 104 may establish a communication link with the client and a corresponding service node 106 via the network 102.

Any of the logic of the processing nodes 200 described herein (whether a standalone processing node 200 or a host or service node 104, 106 acting as a processing node 200) may be accessed via a graphical user interface (GUI) 223 through which a user may interact with the processing node 200, and which GUI may be accessed by a user via a display and/or other interface 204, to access, provide input(s) to, and read or otherwise utilize output(s) from the input engine 222, the legal engine 224, the blockchain manager 226, the analytics engine 228, the promotions engine 230, and/or the database 212. As shown in FIG. 3A, the modules of the above-noted processing node(s) 200 may be accessed by, e.g., a mobile or web-based app which provides the GUI 223. FIG. 3A lists, on conceptual representations of services node 106 of a client and of a trustee, some example actions which may be performed by a user of a node 106, such as via a GUI 223.

Example Will-Creation Process

Figure 3B:
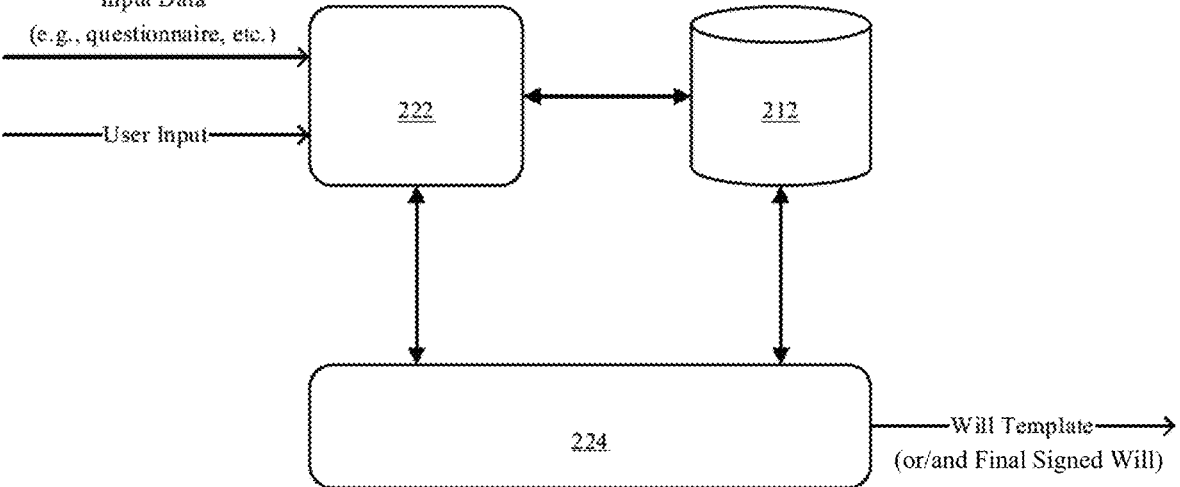

In one aspect, as illustrated in FIG. 3B, the input engine 222 may initiate a will-creation process based on "wills" being selected as the legal document type for the client as shown, e.g., in FIG. 4. Other examples may include any other predefined legal document types (e.g., POA, affidavits, etc.) being additionally or alternatively selected by the input engine 222 based on set conditions or a user input (e.g., an input from the attorney or the host node 104). In the will creation process, the input engine 222 may send a questionnaire to a service node 106 of the new client via the network 102. In one example, the questionnaire may include questions relating to details relevant for creating a will. Examples of these details may include, but are not limited to: (i) name, residential address, contact information (e.g., email address, phone number, social media details such as Facebook™ messenger ID, Instagram™ account ID, WhatsApp™ account number, etc.), date of birth, marital status, a total number and details of dependents as well as related parties (e.g., testator, one or more beneficiaries, executors, guardians, witnesses, etc.) and real-world relationships therebetween, (ii) a status of any existing will, (iii) details of any existing will (e.g., date of creation, date of signing, date of registration, attorney on record, a location and/or a custodian of an original document, or a copy thereof, of the existing will, etc.), (iv) asset details (e.g., asset type, original investment amount, current market value, location, etc.), (v) details of past or ongoing legal proceedings, (vi) an allocation percentage of each asset per beneficiary with or without any predefined wait period and alternate beneficiary or arrangements in case the death of a beneficiary predates that of the testator, (vii) any liabilities and dispositions, and (viii) any special gifts to the beneficiaries. The questionnaire may be either made common or distinct for each legal document type.

Similar to the attorney, the client may register on the DWM system 100 to obtain client login credentials and access the questionnaire. Once registered, the client may login into DWM system 100 using a network node and receive the questionnaire from the input engine 222. Any network node used by the client to login may be recorded as a service node 106 (which may be referred to herein as a client service node 106) by the input engine 222 based on the corresponding login credentials. The questionnaire may be filled out by the client, who may be a testator. In some aspects, the client may not be the testator, and the testator may also register on the DWM system 100 and obtain separate login credentials via the input engine 222. The testator, or the corresponding network node, may be assigned a distinct role, e.g., "testator" and corresponding access rights, in the DWM system 100. In some examples, the input engine 222 may record any network node where login credentials of the testator may be entered as a testator service node 106 in the DWM system 100. The testator may fill out the questionnaire at the testator service node 106. Accordingly, the filled-out questionnaire may be sent out from the client service node 106, or the testator service node 106, to the input engine 222. In some examples, the client service node 106, or the testator service node 106, may also send additional documents (e.g., an existing will document, an identity document such as a copy of passport, etc.) to the input engine 222 either directly or via the host node 104. As illustrated in FIG. 3B, the questionnaire and the additional document may be received as input data by the input engine 222. In some examples, the input engine 222 may also receive inputs from, e.g., the attorney or the host node 104. For instance, inputs from the host node 104 may include the attorney data of the primary attorney. Other instances may additionally include attorney data of a secondary attorney designated by the primary attorney and/or the corresponding network node.

The input engine 222 may send the input data from the testator service node and inputs (in some instances, including the attorney data) from the host node 104 to the legal engine 224. In some examples, the input engine 222 may additionally, or alternatively, store the received inputs and the input data (hereinafter collectively referred to as received data) in the data store 216 for future access and/or retrieval. The input engine 222 may also auto-populate various predefined fields in the dashboard based on the received data. Any additional or incomplete information required but not supplied in the input data may be entered as inputs into the dashboard 223, and hence the data store 216, via the host node 104, e.g., by the attorney.

Figure 5:
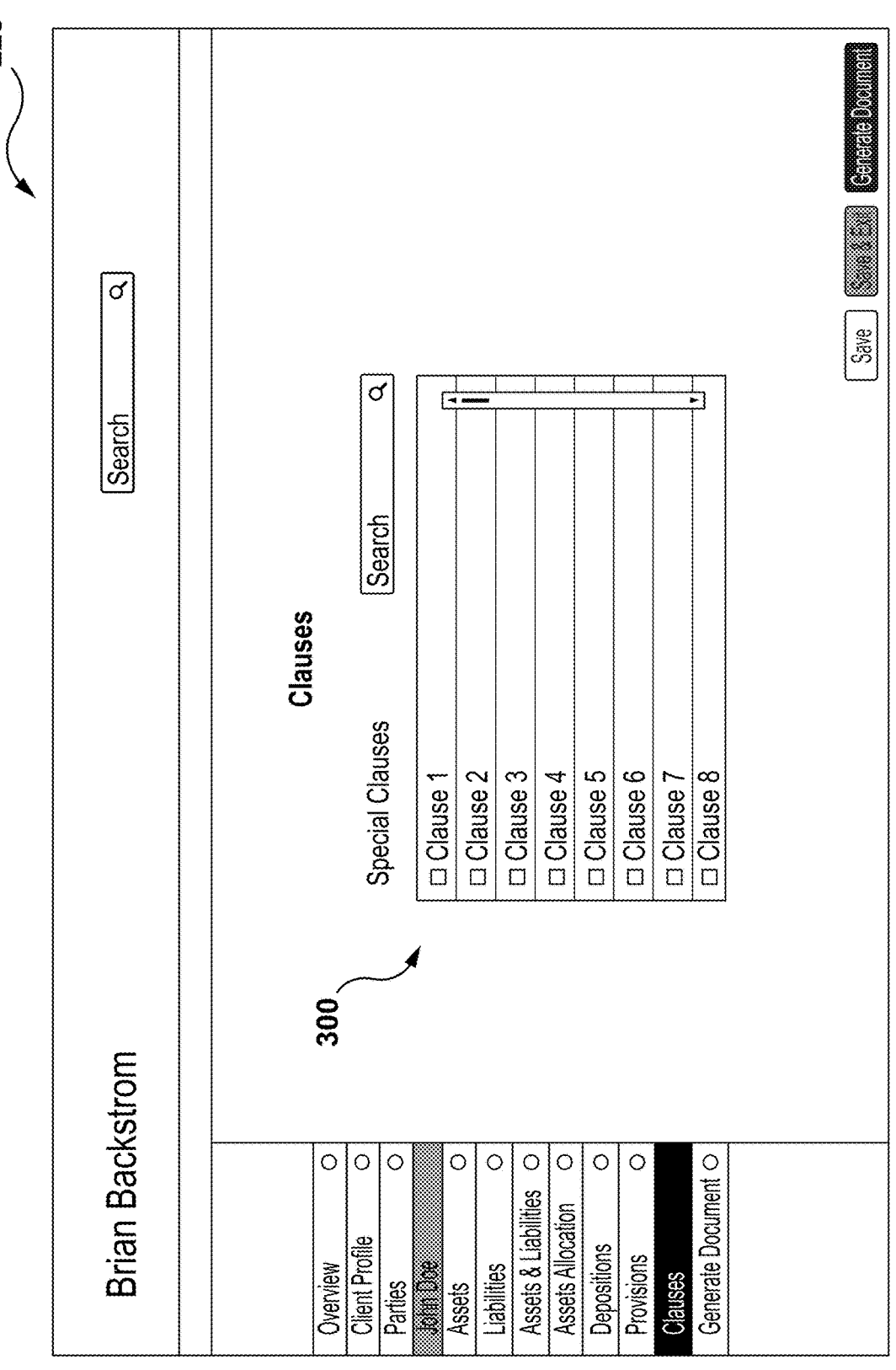

In one aspect, the legal engine 224 may access the received data to create and execute an electronic will (e-will). The legal engine 224 may parse the received data to generate a context-based will template for creating the e-will. For instance, with reference to FIG. 3B, the legal engine 224 may parse the received data based or one or more aspects thereof, including, e.g., without limitation: (i) keywords, (ii) relationships between parties, (iii) asset types, (iv) asset locations, (v) relative locations of the parties including the testator, the attorney, the beneficiary, one or more witnesses, and/or the executor, (vi) a number of beneficiaries, (vii) an asset percentage allocation to one or more beneficiaries, etc.). In accordance with some aspects, the system 100 may use geofencing, such as via IP address, GPS coordinate data, and/or other location checks, and generally may use location-based services, to determine, such as via the legal engine 224, locations (such as of parties) and/or, e.g., to determine applicable laws for regulatory compliance (as applicable; it is expected that users of the system 100 would be able to use the system 100, e.g. to digitally sign a will, regardless of where they are in the world). With reference to FIG. 5, in a first example, the legal engine 224 may access, and/or display, e.g., on a display device connected to a predetermined network node such as the host node 104, a predetermined list of legal clauses 300 based on the input data and/or the parsed data. One or more legal clauses may be selected or deselected from the list by the legal engine 224 based on an indication (e.g., requested or required legal document type) received from a host node 104 or a service node 106. For instance, the legal engine 224 may select one or more legal clauses from the list based on, e.g., at least one of (i) relative locations of the parties with respect to a testator location, (ii) an asset location and (ii) a will type relevant for the testator determined by the legal engine 224 (based on, e.g., the input data, such as based on an indication from the host node 104). The selected legal clauses may provide a first set of legal clauses and may pertain to one or more predefined legal clause types. From the first set of legal clauses, the legal engine 224 may deselect one or more legal clauses for providing a second set of legal clauses. These one or more legal clauses may be deselected based on predefined or dynamically determined one or more criteria in one example. In another example, the one or more legal clauses may alternatively, or additionally be deselected based on a predefined or dynamically defined document length intended for the e-will. The second set of legal clauses may include at least one legal clause of each of the one or more clause types in the first set. The legal engine 224 may be configured for generating the corresponding will template based on the second set of legal clauses; however, other aspects may include the will template being generated based on the first set of legal clauses by the legal engine 224. Further, in another aspect, the legal engine 224 may determine a most relevant will type for the testator based on the parsed data and aspects thereof, including those described above. The most relevant will type may be linked to a group of one or more legal clauses from a predetermined list of legal clauses. The legal engine 224 may generate a will template based on the linked group of one or more legal clauses.

Figure 6:
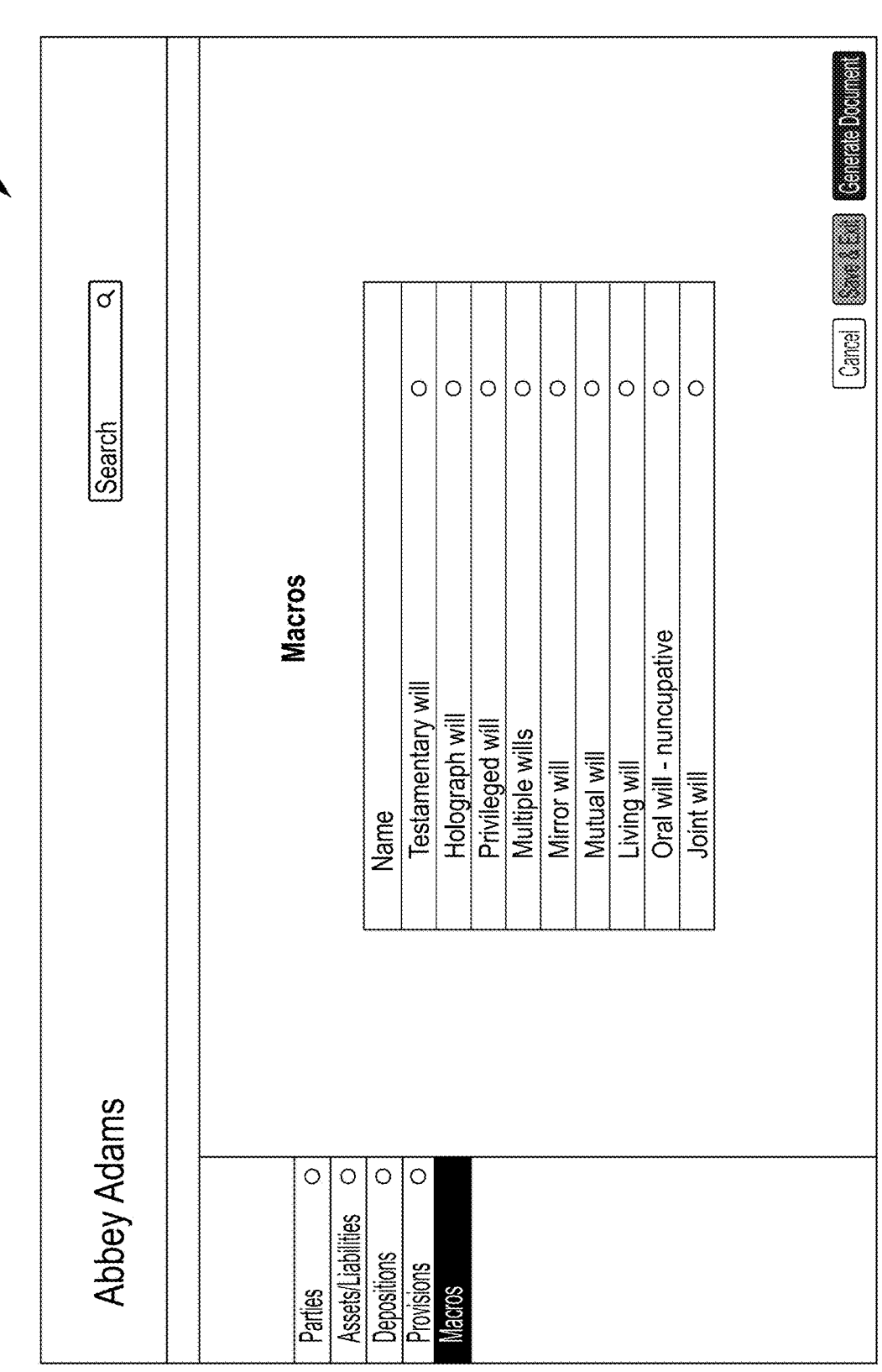

With reference to FIG. 6, in another example aspect, the legal engine 224 may provide a list of will types based on the input data and/or aspects thereof. Each will type may be linked to a group of one or more predetermined legal clauses. Upon selecting a will type, for instance, based on an indication from the host node 104, the legal engine 224 may provide or display, e.g., on a graphical user interface (GUI) on a display device communicatively coupled to the host node 104, a list of one or more predetermined legal clauses from the group relevant to the selected will type. The relevancy of the list of legal clauses may be determined by the legal engine 224 based on (but not limited to): (i) relative locations of involved parties (e.g., testator, attorney, executor, etc.), (ii) asset types, (iii) asset locations, (iv) a predefined (or dynamically defined) document length intended for a will template, which may be based on set terms, (v) the asset percentage allocation to the beneficiaries, or any combinations thereof. Examples of such set terms may include, but are not limited to: (a) a total number of words, (b) a total number of pages, (c) a total number of clauses, (d) a combined number and types of distinct locations (e.g., in terms of country, state or province, city, postal code, etc.) with respect to the locations of involved parties and asset locations, or any combinations thereof. In some aspects, the document length may be dynamically defined by the legal engine 224 (and in some aspects, the document length may be dynamically defined by a machine learning (ML) and/or artificial intelligence (AI) component of the legal engine 224) based on an input received (and where ML and/or AI is used, potentially further based on historical input data), such as from the host node 104. The legal engine 224 may use the list of one or more predetermined legal clauses relevant to the will type to generate a will template.

In another instance, the legal engine 224 may directly generate the will template using the group of one or more predetermined legal clauses linked to the selected will type. Other instances may include the one or more legal clauses being selected or deselected from the relevant list by the legal engine 224 based on preset or dynamically set criteria (e.g., top ten or bottom ten legal clauses or clause types in the relevant list, etc.) to generate a will template. In any of the above examples, the legal engine 224 may also parse, extract, collate, and/or categorize one or more legal clauses from any existing will template that may be received with the input data to update or append to the predetermined list of legal clauses, or clause types in the list. In some aspects, the one or more selected legal clause(s) (which may comprise a first set of clause(s)) may be selected based further on the set of existing legal clause(s) parsed by the legal engine 224 (or the input engine 222) from an existing will provided with the input data, such as from a service node 106. In some instances, the legal engine 224 may categorize the extracted legal clauses based on the predetermined clause types or predetermined will types. Each combination of one or more legal clauses selected by the legal engine 224 in the above examples may assist in improving the scope, applicability and relevancy of the corresponding will template. Further, the legal engine 224 may send the generated will template to a service node 106 associated with the client and/or the testator (or, in some aspects, the testator may access the generated will template from the DDS 108 over the network 102), for review and execution. The client, or the testator, may receive, view, and approve the will template on the corresponding service node. In some examples, as shown in FIG. 7A, the received will template may include empty or editable fields for receiving inputs (e.g., comments) from the service node associated with a user, such as the client or the testator, to capture correct or new data and/or additional data.

Manual Signing Process

The client service node 106, or testator service node 106, may receive the will template for review (e.g., as shown in FIG. 7A), filling out, approval, and/or execution. The will template may be approved by, e.g., selecting the "Sign" button in the will template (shown in FIG. 7A) from a service node 106 of the client or the testator. Based on the approval, in a first aspect, the legal engine 224 may initiate a manual signing process for the will template execution. In the manual signing process, the legal engine 224 may (i) convert the received or approved (by the testator) will template into a template document having any suitable predetermined file format (e.g., pdf, docx, etc.), (ii) download and save the template document locally on (or transmit the template will document over the network 102 to) the service node 106, where the will template may be received, and (iii) store the template document in the data store 216 for future access and/or retrieval. In some examples, additionally or alternatively, the legal engine 224 may send the template document to a remote node (e.g., a service node of an executor designated by the testator in the received data, a computing device, a display device, a printer, a storage device, or any combinations thereof) based on the approval. The user (e.g., the testator, the client, etc.) may access the template document either electronically on a node, such as the corresponding service node 106 and/or the remote node 106, or in an offline manner for review and execution.

In an aspect, the template document may be digitally signed by a user, such as the testator, locally on the corresponding service node 106. In another aspect, the template document may be sent to a printer, such as may be connected to the network 102, for providing a physical copy of the template document. This physical copy may be reviewed offline and signed manually by the testator outside the DWM system 100 to create a signed will document in hardcopy (hereinafter referred to as an offline signed document). The offline signed document may be scanned and converted into an electronic signed will document (or e-will), e.g., using a scanner (or a camera) connected to a processor, which may send the e-will to the service node 106 of the testator, or that of the client. The service node 106 may upload or send the e-will to the input engine 222 via the network 102.

The input engine 222 may (i) receive the e-will, (ii) generate and record a timestamp (e.g., clock time, date, day, or any combinations thereof) at which the e-will may be received (which may alternatively be performed by the legal engine 224), and (iii) determine whether or not the received e-will may have been properly signed and devoid of any errors based on a comparison between the e-will and the stored will template, or the template document (alternatively, such error checking may be performed by the legal engine 224). In one aspect, the input engine 222 (or legal engine 224) may return an error message to the client service node 106, the testator service node 106, and/or the host node 104, when one or more errors may be detected in the received e-will based on the comparison. Examples of the errors may include, but are not limited to, (i) the received e-will having one or more aspects (e.g., text, formatting, order of text, etc.) being substantially altered or different from the stored will template or the template document, (ii) incorrect, illegible, or missing signature(s) in the received e-will, and (iii) software or data errors such as cyclic redundancy checking (CRC) errors in the received e-will. When the received e-will is determined to be properly signed and devoid of any errors, the input engine 222 may send an input and the e-will to the legal engine 224. In one example, this input may be a tag (e.g., numeric, alphanumeric, symbol, etc. that is a unique identifier for the signed electronic will), or alternatively, the legal engine 224 may generate the tag for the electronic will upon receipt from the input engine 222. The legal engine 224 may associate the input, e.g., the tag, with the e-will for providing a first tagged e-will. Additionally, or alternatively, the input, or the tag, may include the timestamp previously recorded by the input engine 222. In some examples, the recorded timestamp may include a clock time (e.g., time of receipt of the e-will from the service node 106), which may be different from the actual time of signing performed locally or manually by the testator. This clock time may be deemed by the input engine 222 as the time at which the e-will, and hence the will template, may have been signed in the DWM system 100. The input engine 222, or the legal engine 224 in some examples, may store the first tagged e-will and the recorded timestamp in the data store 216. The first tagged e-will may be authenticated (or validated) and secured based on various protocols, described below in greater detail.

Video Signing Process

In another aspect, instead of the manual signing process, the legal engine 224 may initiate a video signing process for will execution based on the approval received from the client or the testator, e.g., as may be indicated by selection of the "Sign" button from the corresponding service node. In some aspects, the video signing process may comprise a fully integrated video signing process, meaning that it would not require, invoke or use any third party video or digital signing software or solution, such as Skype™, Zoom™, Google Meet™, DocuSign™, and the like. As such, unlike other known systems, in which the video signing interface may direct a user to different, third party servers (e.g., Zoom™, Adobe™, etc.), the presently described integrated video signing process may be provided entirely by the DWM system 100, which may yield certain security and processing efficiency advantages over known systems, such as by avoiding third party application programming interface (API) integrations. In the video signing process, the legal engine 224 may be configured to organize, manage, and record a video session. For instance, initiating a video session by the legal engine 224 may comprise, e.g., sending out requests by the legal engine 224 (e.g., by text or image messages, call, email, etc.) over the network 102 to schedule and/or join a video session for will/template execution. The requests may be sent to at least (i) respective service and remote nodes (i.e., remote service nodes) 106 associated respectively with the testator and witness(es) designated by the testator or an attorney (such as an attorney of a legal service provider associated with a host node 104), and (ii) the host node 104 associated with the attorney. The witnesses and the attorney may accordingly join the video session, which may be initiated and managed by the legal engine 224, to virtually witness the testator signing the generated will template. The witnesses and the testator may join the video session from respective service and remote nodes 106. During the video session, the testator may sign the will template to generate a signed e-will. In some examples, the legal engine 224 may be configured to request and receive a first input (e.g., a digital signature, a tag such as those noted above, etc.) from a first service node 106 associated with the testator, a second input from the host node 104 associated with the attorney, and a third input from remote service nodes 106 associated with the witnesses during the video session. Each of the first input, the second input, and the third input may be received in any order by the legal engine 224. The first input may indicate signing of the will template, the second input may indicate a presence of a user (e.g., attorney) on a host node 104, and the third input may indicate a presence of another user (e.g., witness) on each of the remote service nodes 106. The first input may also include a first timestamp at which the first input may be received (alternatively, the legal engine 224 may generate the first timestamp which indicates a time at which the first input is received by the legal engine 224). The first input may comprise any identifier that indicates to the legal engine 224 that the e-will has been signed, particularly by the testator, based on the first input being received from a service node 106 associated with the testator. The first input may comprise, e.g., a digital flag (such as a bit flag where '1' may indicate a True state (i.e., signed) and '0' may indicate a False state (i.e., not signed). Further, like the tag in the manual signing process, the first input may alternatively be alphanumeric (e.g., a high-value hexadecimal number or a character set) or represented using a symbol. In some aspects, the first input may be a representative value or term indicative of a set of one or more parameters including, without limitation, bit flag, first timestamp (e.g., clock time, date, day, or any combinations thereof), testator ID in the DWM system 100 or in the processing node 200, sign type (i.e., e-sign or manual sign), and so on. Also, the first input may include or be associated with the first timestamp, which can be a clock time (and/or day and date) at which (i) the e-will is signed (e-will signing time may be the same or different from the clock time when the first input is sent by the testator service node 106 over the network 102 to the input or legal engine 222, 224), or (ii) the first input is received by the legal engine 224, or (iii) the first input is received by the input engine 222. The "sent clock time" and "receive clock time" may be the same or different depending on (i) same or different geographical time zones of the at least one testator service node 106 and the at least one processing node 200/legal engine 224, (ii) clock settings on respective devices/nodes, (iii) and network/Internet connectivity. Similar details can be added for the tag as well in the manual signing process, and the second input and the third input may comprise similar aspects to those described above for the first input, as may be suitable. Further, the video session may be established, recorded, and converted into a video file by the legal engine 224, or a host, service or remote node 104, 106, e.g., using any suitable proprietary or off-the shelf video conferencing software known in the art (the video file may be of a predetermined video file format, or any suitable file format for use with the system 100). In one aspect, the video conferencing software, or corresponding API(s), may be integrated with and/or managed by the legal engine 224 for ease of tracking of the signing process and the e-will. The video file may be recorded for a duration, such as up to a predetermined duration (or until a session end signal is received by the legal engine 224 over the network 102 from the host node(s) 104 and/or the service node(s) 106) and in any suitable format known in the art. The legal engine 224 may also receive or generate a second timestamp (e.g., clock time, date, day, or any combinations thereof) in metadata of the video file. The second timestamp may include a clock time at which the video file may be created or received by the legal engine 224 from the remote node 106. Further, the legal engine 224 may associate the signed e-will with the first input either alone or in combination with one or more of the second input, the third input, the video file and/or metadata thereof (such as the second timestamp) for providing a second tagged e-will.

In some aspects, the second input may include the second timestamp (and further, the third and fourth inputs (such as for a first and second witness, respectively, as described further below), may include third and fourth timestamps, respectively (and any further inputs may accordingly include associated timestamps)). For example, the second input indicates a presence of a user, i.e., attorney, during a video session and is received by the legal engine 224 (directly or via the input engine 222) from the host node 104. The video session is recorded to create a video file either locally by the legal engine 224/processing node 200 or by a service node or remote node 106, where the metadata of the video file includes the second timestamp (e.g., clock time, date, day, or any combination thereof) (and may, in some aspects, also include further timestamps associated with further inputs, such as third and fourth timestamps associated respectively with third and fourth inputs representing, respectively, first and second witnesses present at the video recording session, for example). As such, in the example scenario where there is a first and second input, the second input may in some aspects include the second timestamp, such as where the host node 104 records the video session and sends the corresponding video file (along with the second input) over the network 102 to the processing node 200 and/or the legal engine 224. In some aspects, the second input may not include the second timestamp because they may be created at different time instances as required by the video signing process. For example, the presence of an attorney may be required during the video session for signing of the e-will by the testator. In such aspects, the second input indicating the presence of the attorney may need to be received by the legal engine 224/processing node 200 from the host node 104 as soon as the video session begins so that the exact time of starting the video recording can be determined by the legal engine 224 and/or service/remote node 106. If the second input is never received up to a predetermined threshold time (such as where the attorney is not present in the video session), the legal engine 224 may time-out and reschedule the video session. Therefore, in such aspects, the second input may be required to be received by the legal engine 224 before the video file is created and therefore, may not include the second timestamp.

The legal engine 224 may, in some aspects, also track, maintain and/or display a set of one or more statuses throughout the lifecycle of a legal document. In the dashboard of a display device connected to the host node 104, for example, the legal engine 224 may provide or display different stages of a will in the will creation process, where each stage may be represented by an indicator along with a status thereof. For example, with reference to FIG. 7B, the legal engine 224 may provide one or more statuses such as "In Progress", "Draft Generated", "To Be Signed", and "Completed" for the will (and yet other statuses may be used, including, e.g., "To Be Registered", "Awaiting Client Info", "Registered", "Pending for Client Review", and so on). As shown in FIG. 7B, the legal engine 224 may create a will indicator "Will1" having a status as "In Progress", such as when the input data is received. Upon generation of the will template, a separate will indicator "Will2" may be created along with the template document having a status of "Draft Generated." Further, a separate will indicator, "Will3", may be created having a status of "To Be Signed", along with the corresponding will template document, when the will template is sent to the testator, or the client. Another will indicator, "Will4", may be created having a status of "Completed", along with the corresponding signed (or signed and witnessed) will document, when the e-will is signed (or signed and witnessed) and stored in the data store 216. Each of these example will indicators, namely, "Will1", "Will2", "Will3", and "Will4" in the example shown in FIG.

7B, may correspond to the same will during the will creation process. Other examples may include a single will indicator, e.g., "Will" (not shown), having different statuses, such as those mentioned above, for the will based on different milestones in the will-creation process, until a signed e-will is generated and/or stored in the data store 216.

Any of the tagged e-wills, such as the first tagged e-will or the second tagged e-will, and related data, such as the video file, may be authenticated (or validated) and secured based on various protocols. For example, the dashboard or GUI 223 may provide "Push to Wallet" and a "Push to Vault" options (not shown). Upon selecting the "Push to Wallet" option, the legal engine 224 may send a copy of the tagged e-will to the digital wallet of the client service node 106, and/or the testator service node 106 over the network 102. Any other suitable interface options (e.g., a "Review" button, as shown in FIG. 7A) may be provided on the dashboard 223 of the host node 104 and configured to alternatively, or additionally, perform the functionality of the "Push to Wallet" option. In further examples, the tagged e-will may be encrypted for security using any suitable encryption algorithms known in the art. The tagged e-will may be decrypted at the service node (e.g., client service node) 106, e.g., using a private key of the testator service node 106. On the other hand, the blockchain manager 226 may be triggered based on the "Push to Vault" option being selected.

The "Push to Vault" option may assist to authenticate or validate an e-will execution, or "transaction", based on a virtual presence of an attorney during the video session. The "Push to Vault" option may be selected to provide a validation input. For example, the tagged e-will may be validated or approved (and/or signed by an attorney in some instances) based on a validation input, which may be received from a host node such as the host node 104 associated with the primary attorney. The "Push to Vault" option may be selected on/from the host node 104 to provide the validation input. Further examples may include receiving another validation input from a designated network node (e.g., the testator service node, the client service node, or any other host node, etc.) either additionally, or alternatively, to validate the tagged e-will, or the tagged e-will and related data including the video file. This designated network node providing the additional, or alternative, validation input may be appointed by the host node 104. Such attorney-based or designated node-based approval, indicated by the one or more validation input(s), may authenticate an e-will "transaction" in the DWM system 100 based on a Proof-of-Stake (POS) consensus protocol. Other suitable types of consensus mechanisms known in the art may also be contemplated or additionally implemented.

Based on the received one or more validation inputs, the legal engine 224 may (i) initiate conversion of the tagged e-will into a will document having a predetermined file format such as docx and portable document format (PDF), (ii) store the will document in the data store 216, and/or (iii) trigger the blockchain manager 226. Other examples may include any other suitable interface options being provided on the dashboard of the host node 104 and configured to additionally, or alternatively, perform the functionality of the "Push to Vault" option (not shown) (to push, via the legal engine 224, over the network 102, the tagged electronic will to a secure digital vault 210 (such as of the DDS 108) upon receipt of the validation input). For instance, in one aspect, the selection of the "Sign" button shown in FIG. 7A, as discussed above, may additionally trigger the legal engine 224 to sequentially provide the validation input after the tagged e-will is generated. In another aspect, the dashboard of the host node 104 may include a "Registration" or "Push to Vault" option (not shown) that upon activation pushes the tagged electronic will to the secure digital vault 210 over the network 102. The "Registration" or "Push to Vault" option, upon being selected, may (i) trigger the legal engine 224 to provide the validation input, and (ii) trigger the blockchain manager 226 to send the tagged e-will, either before or after being converted into a predetermined file format, to any preset network node such as the registry node. The preset network node may be designated by a host node 104 via the input engine 222. In accordance with some aspects, "Push to Wallet" and "Push to Vault" functionality may be executed automatically or by default, without being selected by a user. For example, the functionality of Push to Vault may happen automatically when a signed e-will is registered, and the functionality of Push to Wallet may happen automatically when there is a mobile login available and a signed e-will is uploaded.

The blockchain manager 226 may be configured to create and maintain a distributed ledger (e.g., a blockchain) 103 and to detect tampering, and therefore assist in verifying and/or maintaining authenticity of the legal documents, such as an e-will and related data (e.g., video file) including metadata. The distributed ledger, or a data structure related thereto providing a blockchain, may employ a decentralized scheme for providing authority and trust to a decentralized computing network, such as the DWM system 100, and enable the network nodes to continuously and/or sequentially record e-will transactions on a public or a private "block" of the distributed ledger 103, creating a unique "chain" referred to as a blockchain. Examples of the blockchain may include, but are not limited to, a private blockchain (e.g., Hyperledger Fabric™, StampD™, etc.), a public blockchain (e.g., Ethereum™, Solana™, Cardano™, etc.), a hybrid blockchain (e.g., Polkadot™, Dragonchain™, etc.), and a consortium blockchain (e.g., R3 Corda™, Quorum™, etc.).

In one aspect, the blockchain manager 226 may determine or calculate a first hash value for the will document and a second hash value for the video file, including related data and metadata. Each of the first hash value and the second hash value (hereinafter collectively referred to as hash values) may be calculated based on distinct predetermined hash functions and/or distinct hashing algorithms (e.g., MD5, SHA-256, etc.). For example, the first hash value may be calculated based on a predetermined first hash function and the second hash value may be calculated based on a predetermined second hash function, where the first hash function may be based on metadata and data of the will document and the second hash function may be based on metadata and data of the video file. In some example aspects, the blockchain manager 226 may modify a copy of the first hash value or the first hash function based on the second hash function and/or the metadata of the video file to provide a modified hash value for the will document. Similarly, further examples may include a copy of the second hash value or the second hash function being modified based on the first hash function and/or the metadata of the will document to provide another modified hash value for the video file. In some other examples, each of the hash values may be calculated based on a common hash function alone or in combination with a respective distinct hash function. Using different or distinct hash functions alone or in combination with distinct hashing algorithms for determining hash values may assist in countering a possibility of hash function collision. Other examples may include the first hash value being modified (e.g., appended) with the second hash value, or vice versa, based on metadata of the respective files such as the will document and the video file.

The hash values, or the modified hash values, may assist to secure an authentication of a transaction (e.g., e-will transaction) or the underlying will document, and assist in improving verifiability against tampering such as hash attacks. Each of the hash values, including any updates thereof, may be stored on a new data block in the distributed ledger 103 by the blockchain manager 226. Each created data block may additionally include one or more timestamps (e.g., the first timestamp and the second timestamp) and a link to a previous data block. A copy of the hash values, including updates thereof, may also be stored in the data store 216 and displayed in the dashboard (e.g., on a display device connected to the host node 104) for reference by the blockchain manager 226. Moreover, the will document and the video file may be encrypted and stored in the vault 210. In case of any updates to the e-will or the tagged e-will, a new version of the will document and related data, such as a new video file, may be created, e.g., using the will-creation process and/or video signing process (or the manual signing process), as described above.

Once the new version of the will may be approved or validated as described above, the blockchain manager 226 may (i) recalculate the first and the second hash values, as well as the modified hash values, for the updated/new will document and the new video file respectively, (ii) create a new data block with the recalculated hash values and new timestamps (e.g., creation dates of the video file and that of the will document) stored thereon in the blockchain 103, (iii) encrypt and store the latest version of the will document and the new video file, along with related data including meta-data, in the vault 210, and (iv) place inactive or older versions of the will document and the old video file in the archive 214. Hence, the blockchain 103 may assist to hold, track, transfer, and verify information. Other aspects may include a group of one or more blockchain nodes (e.g., one or more host nodes 104) within a blockchain network, e.g., including the DWM system 100, triggering the e-will trans-action, or any authentication/verification thereof, with respect to the distributed ledger (or blockchain) 103 through any suitable endorsement and/or consensus protocol(s). Such group of multiple blockchain nodes may either operate independently or in combination with one or more other network nodes (e.g., one or more service nodes 106 such as the testator service node 106 and/or the client service node 106, etc.) to provide the related triggers noted above, thereby ensuring that any one entity or network node cannot change the distributed ledger 103 on their own. Further aspects may include the non-blockchain nodes providing a trigger to the blockchain nodes for triggering, managing, authenticating, and/or verifying the e-will transaction and/or related data (e.g., the tagged e-will, the will document, the video file, etc.).

Figure 8:
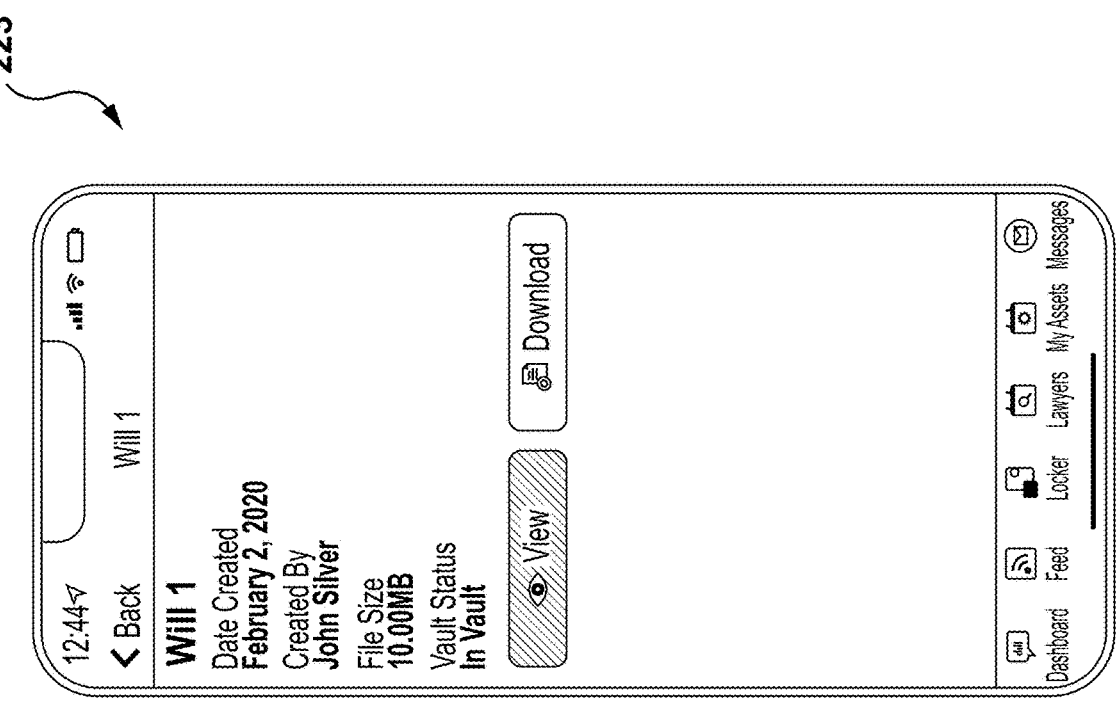
Figure 8:
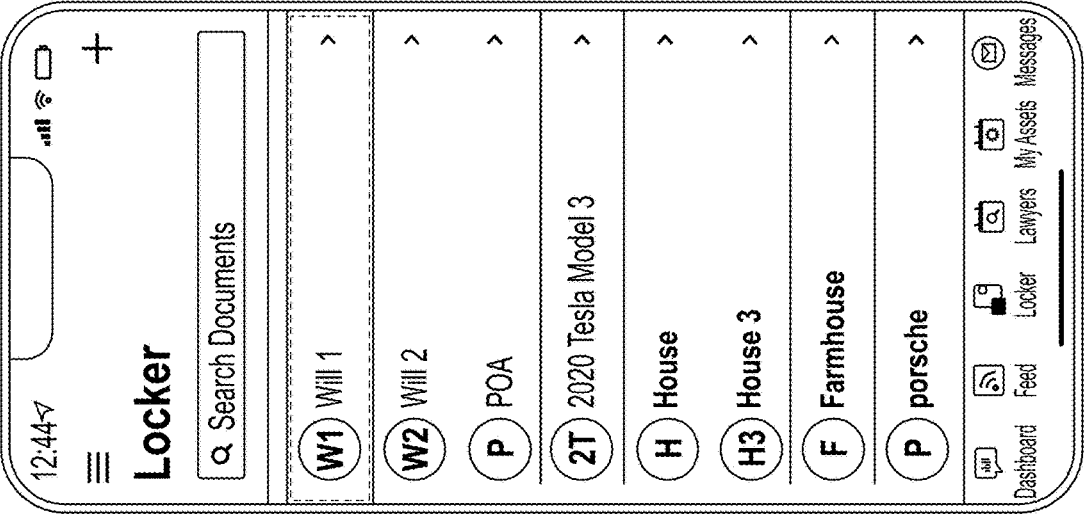

The client, or the testator, may access a copy of the tagged e-will, or the related will document, on the respective service node 106. The copy may be received in the digital wallet, or a digital locker, associated with the respective service node 106 or role, e.g., as illustrated in FIG. 8. Further, in one aspect, the blockchain manager 226 may be configured to securely notify a remote service node 106 associated with a role of a designated "executor" or "trustee", and provide access thereto of the testator's digital wallet, or digital locker, based on a triggering life event (e.g., death, change in marital status, etc.) of the testator. In one example, the blockchain manager 226 may receive an indication of a will triggering event, such as an indication regarding the triggering life event of the testator. Examples of the indication may include, but are not limited to, a trigger document (e.g., death certificate, marriage certificate, gradu-ation certificate, etc.), an audio file, a video file, or any combinations thereof. The blockchain manager 226 may receive the indication from one of the registered service nodes via the input engine 222. Examples of such registered nodes may include, but are not limited to, the client service node 106, the testator service node 106, the registry node 106, an executor service node 106, and a beneficiary service node 106. The indication may be stored in the data store 216 by the input engine 222. Upon receipt of the indication, the input engine 222 may trigger the blockchain manager 226, which may be configured to (i) create a smart contract between the executor (or executor's service node 106) and the testator (or testator's service node 106), and (ii) transfer or provide the testator's wallet, or access rights/permissions thereto, to the executor (or the executor service node 106). In some examples, the input engine 222 may create the smart contract as soon as the executor and the corresponding service node 106 (hereinafter referred to as executor's service node 106) may be (i) designated by the testator (e.g., upon receipt of the received data) and/or (ii) the executor's service node 106 may be registered on the DWM system 100, e.g., via the input engine 222.

Referring again to FIG. 2, FIG. 2 provides a generalized figure of a network node 104, 106 for executing method steps described herein. For example, the processing node 200, in one aspect, may be either a host node 104 or a service node 106. Alternatively, in another aspect, the processing node 200 may be an independent and standalone network node (separate from the host node 104 and the service nodes 106), which can be invoked by the host node 104 or one of the service nodes 106 to perform some or all of the method steps described herein. The database 212 may be located locally on the processing node 200 or remotely from the processing node 200, e.g., on the external data storage 208. The database 212 may, in some aspects, need to be parti-tioned or separate from the vault 210 because, as compared to the database 212 (the contents of which are used locally by the processing node 200), the vault 210 may need to make its contents more readily available to all network nodes 104, 106, as it contains the latest, signed and encrypted legal documents and, in some aspects, video files, and therefore, the vault 210 preferably has minimal to no downtime.

In some aspects, the method steps described herein may result in off-chain data (i.e., data not on the distributed ledger 103) that comprises the generated legal documents (e.g., wills) and video files, irrespective of being encrypted or signed, whereas the on-chain data (i.e., data on the distributed ledger 103) may comprise hash values and timestamps, for example.

Further, in some aspects, the vault 210 may comprise a cloud storage and, in further aspects, may comprise a blockchain database 210 (such as when the vault 210 is on the external data storage 208, which may be a decentralized storage such as the DDS system 108). The generated legal documents (e.g., wills), after signing, and the video file(s), may in some aspects first be stored in the data store 216, such as for review and preliminary check for correctness by a user such as an attorney (who may be a user of a host node 104 comprising a processing node 200, or who may access an interface or GUI 223 of the processing node 200 via the host node 104 over the network 102). In some aspects, the stored legal documents may then be processed by the blockchain manager 226 to calculate hash values and to be encrypted. In some aspects, the encrypted signed legal documents (and the encrypted video files) may then be stored in the vault 210 for being accessed by service nodes 104, 106. In some aspects, the inactive and/or old versions of legal documents (e.g., wills) may be stored in the archive 214.

In some aspects, the external data storage 208 (including the vault 210) may be needed if the host node 104, acting as a processing node 200, is a personal computing device (e.g., laptop, smart phone, etc.), so that access to the latest version of legal documents (e.g., wills, video files) stored on the vault 210 is not restricted for the service nodes 104, 106, such as the testator service node 106, due to the host node 104 being switched off by a user, e.g., an attorney. In some aspects, the DDS system 108 is an example of the external data storage 208, and both data storage systems 108, 208 may be decentralized or distributed. As such, reference to a decentralized data storage (DDS) 108 herein may comprise the DDS 108, the external data storage 208, or a combination of both, and vice versa.

Figure 9:
Figure 9:
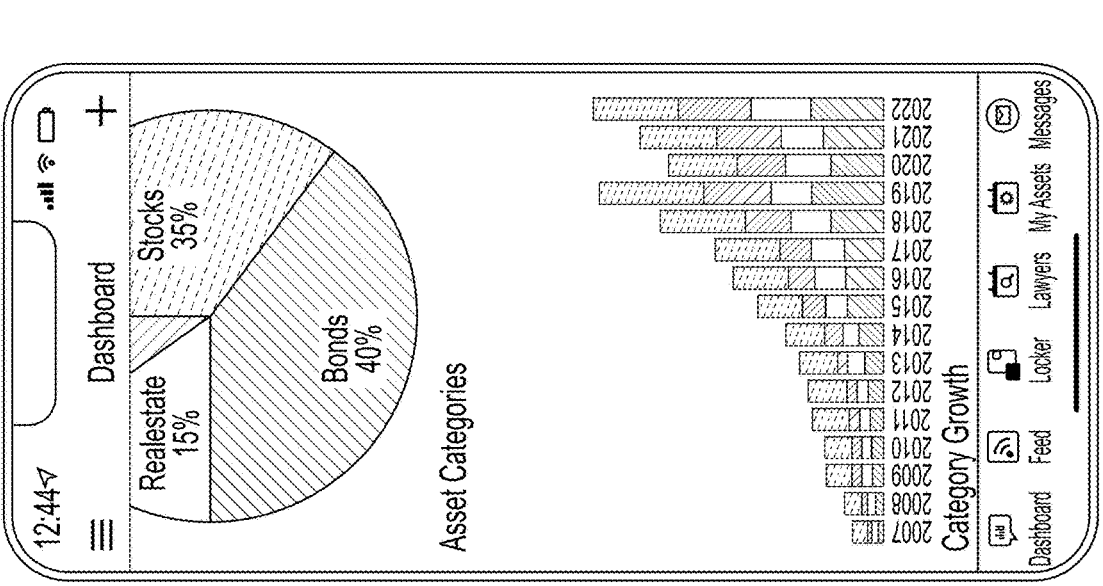

Any of the service nodes 106 may also be configured to generate or receive analytics information regarding the assets related to the e-will or the tagged e-will. For example, as illustrated in FIG. 9, the analytics engine 228 may access and analyze the input data, the attorney data (which may comprise part of the input data in some aspects), details of the registered users, roles, or nodes stored in the data store 216 to generate visualizations such as, but not limited to, a pie chart representing asset categories and a bar graph representing trends in one or more asset categories. The analytics engine 228 may push the visualizations and related data including metadata to a registered service node. In another example, the registered service node may include one or more specialized software applications (e.g., Dapps) operating in communication with the analytics engine 228 to generate such visualizations. Any of such software applications may also assist in determining a total asset value, and/or a total estate value based on a comparison between values of assets and liabilities. In yet another example, the analytics engine 228, independently or in combination with a software application on the service node, may also provide recommendations and updates based on (i) the input data, (ii) the legal document and/or related data (e.g., e-will, will document, video file, etc.), and/or (iii) predetermined users, roles, or nodes.

Similarly, the analytics engine 228 may also generate visualizations for the host node such as the host node 104, or the role associated therewith such as the "attorney". For example, the analytics engine 228 may analyze the data stored in the data store 216 to generate visualizations such as, but not limited to, a widget or an image representing a total number of clients, a widget or an image representing an average age of wills, a widget or an image representing a total number of wills initiated or executed, a widget or an image representing an average age of clients and/or testator, a bar graph representing month-wise trend in total value of assets, a month-wise trend in document traffic, a doughnut chart representing asset allocation, a doughnut chat representing a total liability, and so on.

The promotions engine 230, either independently or in combination with a software application on the intended service node, may (i) send or receive messages, notifications, alerts, reminders, feeds (e.g., social media feeds), and/or advertisements, and book appointments based on predetermined users, roles, and/or network nodes, and/or (ii) create a service marketplace for the clients based on the registered users and/or roles. The promotions engine 230 may assist to keep the client, or any other registered user, engaged by pushing service-related content and promotional materials (e.g., blogs, offers, discounts, etc.) to the corresponding service node. Further, the host node 104 may receive notifications from the promotions engine 230 based on an activity on the promotions by any of the service nodes such as the service nodes 106 connected to the network 102.

Figure 11:
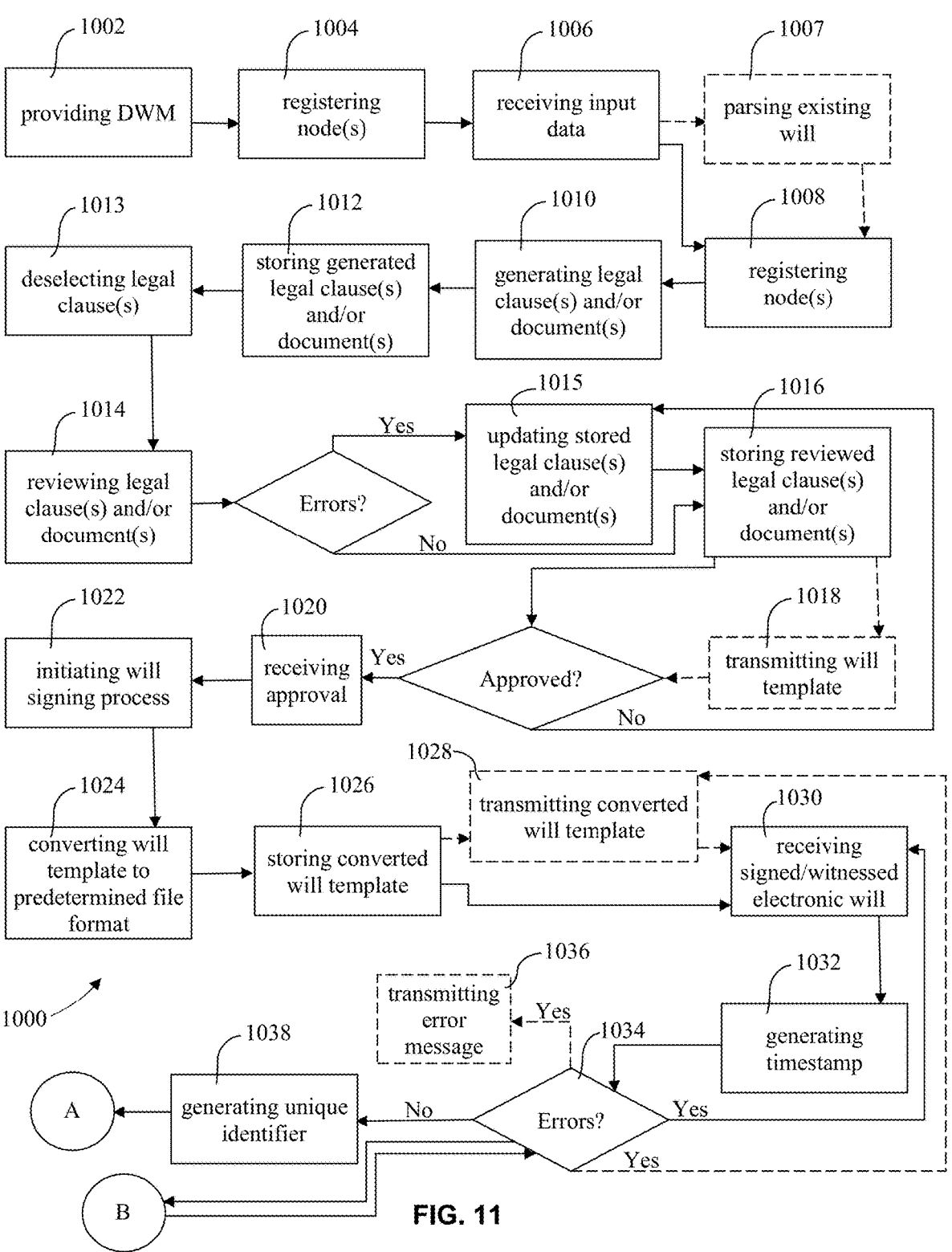
FIG. 11 depicts a flow diagram of an example of a method described herein.

With reference to FIG. 11, in accordance with some aspects, a computer-implemented method 1000 of creating or managing legal documents may comprise: providing 1002 a decentralized legal document management (DWM) system including a non-transitory computer-readable decentralized data storage (DDS) 108, 208, a distributed ledger 103, and one or more nodes 104, 106, 200, the DDS 108, 208 and the one or more nodes 104, 106, 200 communicatively coupled to each other over the network 102, the one or more nodes each including one or more processors 202, 402 communicatively coupled to interfaces 204, 406 and a local and/or remote non-transitory computer-readable medium 206, 404 including instructions executable by the respective one or more processors 202, 402. The one or more nodes may include: at least one host node 104, each host node associated with a legal service provider; at least one service node 106, each service node associated with an entity seeking legal service; and at least one processing node 200, each processing node 200 further comprising an input engine 222 for prompting for and/or receiving input (such as over the network 102), a legal engine 224, and a blockchain manager 226. Each of the input engine 222, the legal engine 224 and the blockchain manager 226 may be communicatively coupled to the one or more processors 202 of the respective processing node 200.

In some aspects, the method 1000 may further comprise, registering 1004, using the input engine 222, the host node(s) 104 and the service node(s) 106 with the DWM system 100. In some aspects, the method 1000 may further comprise: receiving 1006, using the input engine 222, input data (which may include attorney data) over the network 102 from the host node(s) 104 and/or the service node(s) 106. The input data may include at least a legal service to be provided to the service node(s) 106. The method 1000 may also comprise: accessing 1008, from each non-transitory computer-readable medium 206, using the legal engine 224, a predetermined list of legal clause(s) and/or legal document(s); generating 1010, using the legal engine 224, one or more legal clause(s) and/or one or more legal document(s) from the predetermined list of legal clause(s) and/or legal document(s) based on the received input data (such as by selecting from amongst the predetermined list of legal clause(s) and/or legal document(s) based on the received input data); and storing 1012 the generated one or more legal clause(s) and/or one or more legal document(s) in the non-transitory computer-readable medium(s) 206 (such as in the database 212, such as the data store 216 thereof). In some aspects, the method 1000 may also comprise reviewing 1014, for correctness and suitability for the legal service to be provided, by the legal service provider (e.g., one or more attorney(s) of the legal service provider), the stored one or more legal clause(s) and/or one or more legal document(s) to generate reviewed one or more legal clause(s) and/or one or more legal document(s). The method 100 may further comprise: storing 1016 the one or more legal clause(s) and/or one or more legal document(s) in the DDS 108, 208, the DDS 108, 208 accessible by the host node(s) 104 and the service node(s) 106 over the network 102. In some aspects, if, after reviewing 1014, it is determined that there are errors or issues to be addressed, the system 100 may prompt for further input and receive 1006 updated input that addresses the errors or issues, and/or the reviewer or legal service provider (e.g., attorney(s) thereof) may manually update 1015, where determined by the legal service provider (e.g., attorney(s) thereof) to be necessary based on the reviewing 1014, the stored legal clause(s) and/or legal document(s), before the reviewed and updated legal clause(s) and/or legal document(s) are stored 1016.

In accordance with some aspects, (i) some or all of the legal clause(s) and/or legal document(s) generated 1010 from the predetermined list of legal clause(s) and/or legal document(s) may be generated (e.g., selected) or suggested by a machine learning (ML) and/or artificial intelligence (AI) component of the legal engine 224, which to some extent may depend on learnings from the contextual histori- cal data of selected clauses that may reveal patterns in the historical input data; (ii) custom clauses or provisions, and/or documents, may be added by an attorney (such as an attorney of a legal service provider associated with a host node 104), and/or such attorney may manually update or delete one or more clause(s) (and/or document(s)) from the predetermined list of legal clause(s) (and/or document(s)); and/or (iii) an attorney may manually select or deselect specific clause(s) and/or document(s) from the predeter- mined list of legal clause(s) and/or document(s). In accor- dance with some aspects, any of the modules described herein, including the input engine 222, the legal engine 224, the blockchain manager 226, the analytics engine 228, and/or the promotions engine 230, may use machine learn- ing (ML) and/or artificial intelligence (AI) to carry out some or all of the method steps or other actions described herein.

In some aspects, as described above, the host node(s) 104 and/or the service node(s) 106 may comprise the processing node(s) 200. The legal service to be provided may, in some aspects, comprise any legal service by which a digital document may be provided, such as an electronic will, power of attorney (POA) for personal care, power of attor- ney (POA) for property, affidavit, contract, or deed, as non-limiting examples only. Where the legal service to be provided comprises an electronic will and the input data includes a will type, the predetermined list of legal clause(s) and/or legal document(s) may comprise legal clause(s) and/ or legal document(s) relevant to the will type. In such aspects, the entity seeking legal service and associated with the service node(s) 106 may be a testator, and the nodes 104, 106 may further include at least one remote node 106, each remote node 106 being associated with one or more wit- nesses, such as may be designated by the testator or an attorney (such as an attorney of a legal service provider associated with a host node 104), such as in the input data. Further, in such aspects, the input data may further comprise details of parties relevant to the electronic will, asset details for the electronic will, asset allocation details for the elec- tronic will, and any other details relevant to the electronic will. The parties may include, e.g., the testator, one or more witnesses, one or more beneficiaries, and an executor.

In some aspects, generating 1010 the legal clause(s) may provide a first set of clause(s). The generated legal clause(s) (i.e., the first set of legal clause(s)) may be selected based on at least one of: (i) relative locations of the parties with respect to a testator location; (ii) asset location; and (iii) a will type relevant for the testator, all of which may be determined based on the input data. The first set of clause(s) may comprise one or more clause types, as described above.

In accordance with some aspects, the method 1000 may further comprise deselecting 1013, using the legal engine 224, one or more clause(s) from the first set of clause(s) to provide a second set of clause(s). For example, the step of generating 1010 the legal clause(s) may further comprise the step of deselecting 1013 described above. The one or more deselected clause(s) may be deselected based on at least the document length (e.g., length of the will document), which may be predetermined, or dynamically defined by the legal engine 224 based on the input data (and in some aspects, the document length may be dynamically defined by a machine learning (ML) and/or artificial intelligence (AI) component of the legal engine 224 based on an input received and, in some aspects, further based on historical input data). In accordance with some aspects, the second set of clause(s) may include at least one legal clause of each of the one or more clause types. In some aspects, the stored 1012 (and in some aspects, reviewed 1014) legal clause(s) and/or legal document(s) in the DDS 108, 208 may comprise a will template for creating the electronic will, and the will tem- plate may be based on one of the first set of clause(s) and the second set of clause(s).

In accordance with some aspects, where the input data includes an existing will, the method 1000 may further comprising parsing 1007, by the legal engine 224, the existing will, to determine a set of existing legal clause(s). In some aspects, one or more of the existing legal clause(s) may be appended to or used to otherwise update the prede- termined list of legal clause(s) and/or document(s), and/or the legal clause(s) of the first set of clause(s) may be generated 1010 based further on the set of existing legal clause(s) (e.g., the existing legal clause(s) may inform which of the predetermined list of legal clause(s) and/or legal document(s) is appropriate for selection to generate 1010 the legal clause(s) and/or document(s) (i.e., the first set of clause(s) and/or document(s)). In some aspects, the method 1000 may also comprise transmitting 1018, from the pro- cessing node(s) 200 to the service node(s) 106, over the network 102, the will template for review, input of corrected or additional data, approval, and/or execution by the testator, although such review, input of corrected or additional data, approval, and/or execution by the testator may alternatively or additionally occur by the testator accessing the stored will template in the database 206, 212, 216, such as via the service node(s) 106 over the network 102.

In accordance with some aspects, the method 1000 may further comprise receiving 1020 (e.g., as further input data) an approval of the will template from the testator over the network 102 (such as from the testator's service node 106). If the will template is not approved, the testator may provide input data indicating such, and the steps of reviewing 1014 and/or updating 1015 the legal clause(s) and/or document(s) may take place again, to attend to any corrections or other changes required as indicated by the testator in the input data. In some aspects, such as after an approval is received 1020, the method 1000 may further comprise initiating 1022, by the legal engine 224, a non-video or video will signing process. For example, in accordance with some aspects, the method 1000 may further comprise: converting 1024 the will template (such as the approved will template) to a predetermined file format (as described above), by the legal engine 224; storing 1026, by the legal engine 224, the converted will template in the non-transitory computer- readable medium(s) 206 (such as in the database 212, such as in the data store 216 thereof) of the at least one processing node 200 and, optionally, transmitting 1028, by the legal engine 224, from the processing node(s) 200 to the service node(s) 106, such as via the interfaces 204 over the network 102, the converted will template, for access, and digital or non-digital execution, by the testator (to provide the electronic will), although such execution by the testator may alternatively or additionally occur by the testator accessing the converted will template in the database 206, 212, 216, such as via the service node(s) 106 over the network 102 (where the signing is manual (i.e., non-digital), the will being made electronic by, e.g., scanning the signed paper will to electronic form, or taking a digital picture thereof to generate the electronic will). In accordance with some aspects, the method 1000 may further comprise: receiving 1030, by the input engine 222, the signed, or signed and witnessed, electronic will; and generating 1032, by the legal engine 224, a timestamp indicating a time when the electronic will is received 1030 by the input engine 222. In further aspects, the method 1000 may further comprise: determining 1034, by the legal engine 224, if the received electronic will contains one or more errors by at least comparing the received electronic will with the will template.

If one or more errors is detected in the received e-will based on the comparison, the method 1000 may further comprise transmitting 1036, by the legal engine 224, an error message to the service node(s) 106 and/or the host node(s) 104, which may be indicative of the error(s) present and which may result in the method 1000 further transmitting 1028 the converted will template for execution again, or where the will template is not transmitted (or transmitted again) 1028, receiving 1030, by the legal engine 224, another signed (or signed and witnessed) electronic will that addresses the error(s).

In accordance with some aspects, the method 1000 may further comprise, such as if there are no errors, generating 1038, by the legal engine 224, a unique identifier for the electronic will; associating 1040, by the legal engine 224, the electronic will with the unique identifier to generate a tagged electronic will; and storing 1042, by the legal engine 224, the tagged electronic will with the associated timestamp in the non-transitory computer-readable medium(s) 206 (such as in the database 212, such as in the data store 216 thereof) of the at least one processing node 200. The unique identifier (or tag) may in some aspects include at least in part the timestamp.

In accordance with some aspects, the method 1000 may further comprise: initiating 1044, by the legal engine 224, a video session between the at least one host node 104, the at least one service node 106, and the at least one remote node 106 over the network 102, for video recording signing of the converted will template by the testator on the at least one service node 106 to generate the electronic will; receiving 1046, by the legal engine 224 over the network 102, a first input from the at least one service node 106, a second input from the at least one host node 104 and a third input from the at least one remote node 106 during the video session, the first input indicating the signing of the converted will template, the second input indicating a presence of a first user on the host node 104 (e.g., an attorney), and the third input indicating a presence of a second user on the remote node 106 (e.g., a witness), as described above (in some aspects, there may be further inputs received 1046, by the legal engine 224 over the network 102, such as a fourth input from another of the remote node(s) 106 during the video session, the fourth input indicating, e.g., a presence of a third user on the remote node 106 (e.g., another witness), and as such, the step of receiving 1046 may comprise receiving 1046, by the legal engine 224 over the network 102, a first input (indicating the signing of the converted will template) from the at least one service node 106, and at least one further input, such as a second input (indicating a presence of a first user on the host node 104 (e.g., an attorney) and/or at least one additional input (such as the third input indicating a presence of a second user on the remote node 106 (e.g., a witness), or both the third input and the fourth input, the fourth input indicating, e.g., a presence of a third user on a remote node 106 (e.g., another witness)); recording 1048, using the legal engine 224 (such as a recording device triggered to activate by the legal engine 224), the video session (which may, e.g., be recorded for a predetermined duration, or until a session end signal is received by the legal engine 224 over the network 102 from the at least one host node 104 and/or the at least one service node 106); and converting 1050, by the legal engine 224, the at least one host node 104, the at least one service node 106, or the at least one remote node 106, the recorded video session into a video file.

In accordance with some aspects, the method 1000 may further comprise, after the step of initiating 1044, by the legal engine 224, a video session between the at least one host node 104, the at least one service node 106, and the at least one remote node 106 over the network 102, for video recording signing of the converted will template by the testator on the at least one service node 106 to generate the electronic will: presenting 1045, during the video session, by the legal engine 224 over the network 102, the converted will template on a display 204, 406 of each of the at least one host node 104, the at least one service node 106, and the at least one remote node 106. In accordance with some aspects, scrolling of the converted will template on the display 204, 406 of the at least one host node 104 may similarly scroll, in real-time or near real-time (accounting for processing and/or network 102 delays), the converted will template on the display 204, 406 of each of the at least one service node 106 and the at least one remote node 106 such that the host node(s) 104, the service node(s) 106 and the remote node(s) 106 concurrently, or nearly concurrently, view like parts of the converted will template and on-screen actions (such as the signing of the will, edits, etc.) (i.e., scrolling up on the converted will template document on the display 204, 406 of a host node 104 causes the legal engine 224 to mirror or nearly mirror the upward scrolling of the converted will template document on the display 204, 406 of the service and remote node(s) 106, and scrolling down on the converted will template document on the display 204, 406 of a host node 104 causes the legal engine 224 to mirror or nearly mirror the downward scrolling of the converted will template document on the display 204, 406 of the service and remote node(s) 106, and in the same manner; e.g., scrolling up for two about seconds to Section 22 of the document, pausing for about one second, and then scrolling down for about three seconds to Section 17 of the document, on a display 204, 406 of a host node 104, may cause the legal engine 224 to scroll the converted will template document up for about two seconds to show Section 22 of the document, pause for about one second, and then scroll down for about three seconds to show Section 17 of the document, on the displays 204, 406 of the service and remote node(s) 106). Further, in some aspects, the converted will template may be scrollable independently by each of the service node(s) 106 and the remote node(s) 106 when there is no such scrolling of the converted will template document on the display 204, 406 of the host node(s) 104. In this way, during a video signing and recording session that is initiated 1044 by the legal engine 224, an attorney (such as of a legal service provider associated with a host node 104) may load the converted will template on his or her display 204, 406, at which point all participants (the attorney, the testator via a service node 106, and one or more witnesses via remote node(s) 106) can see the converted will template on their respective displays 204, 406. When the attorney scrolls the converted will template up or down on his or her display 204, 406, the client or testator, and the witness(es) may also see the same page and section of the converted will template that the attorney is seeing, concurrently (or nearly concurrently, accounting for processing and/or network 102 delays). On the other hand, when the attorney is not scrolling the converted will template document, then the client or testator, and the witness(es), may each scroll the converted will template document independently, to review whichever area of the converted will template document they would like to review (e.g., the attorney's display 204, 406 may show page 3 of the converted will template document, whereas the testator's display 204, 406 may show page 2 of the converted will template document, and a witness(es)' display 204, 406 may show page 5 of the converted will template document. In some aspects, once the attorney begins to scroll the converted will template document again, the viewable area of the converted will template document on the displays 204, 406 of the service and remote nodes 106 of the client or testator, and the witness(es), may then be aligned with what the attorney is viewing on his or her display 204, 406 (i.e., the client or testator, and the witness (es), despite what parts of the converted will template document they may have independently scrolled to while the attorney was not scrolling the converted will template document, may be brought back to the position on the converted will template document that the attorney is viewing as soon as the attorney scrolls to that position).

In accordance with some aspects, the step of determining 1034, by the legal engine 224, if the received electronic will contains one or more errors may further comprise validating 1052, using the legal engine 224, the video file based on a validation input received by the legal engine 224 over the network 102 from the at least one host node 104 and/or the at least one service node 106.

In accordance with some aspects, the method 1000 may further comprise: generating 1054, by the legal engine 224, a first timestamp indicating a time at which the first input is received by the legal engine 224; and generating 1056, by the legal engine 224, a second timestamp indicating a time at which the video file is generated 1050, or received over the network 102, by the legal engine 224. The unique identifier may include the first input alone or in combination with one or more of the second input, the third input and/or the fourth input (and/or any other additional input(s)), the video file and/or metadata of the video file, as described above. In some aspects, the method 1000 may also comprise pushing 1058, by the legal engine 224, over the network 102, the tagged electronic will to a digital wallet associated with the at least one service node 106 (in some aspects, this step 1058 may take place later, as described below).

In some aspects, the method 1000 may further comprise: receiving 1060, by the legal engine 224 over the network 102, a validation input from any of the host node(s) 104 and the service node(s) 106, the validation input validating at least the signing of the converted will template (and in some aspects, validating also the video file) to authenticate the will signing as an authenticated transaction; and encrypting 1062 the tagged electronic will, or both the tagged electronic will and the video file.

In some aspects, the method 1000 may further comprise: pushing 1064, by the legal engine 224 over the network 102, the encrypted tagged electronic will, or the encrypted tagged electronic will and the encrypted video file, to a secure digital vault 210 of the DDS 108, 208 upon receipt of the validation input. In some aspects, it is at this stage that the step of pushing 1058 to the digital wallet may take place, such that step 1058 instead comprises pushing 1064, by the legal engine 224, over the network 102, the encrypted tagged electronic will, or the encrypted tagged electronic will and the encrypted video file, to both secure digital vault 210 of the DDS 108, 208 and to the digital wallet associated with the at least one service node 106.

In accordance with some aspects, the method 1000 may also comprise: calculating 1066, using the blockchain manager 226, a first hash value for the will document and a second hash value for the video file, the first hash value being calculated based on a predetermined first hash function and the second hash value being calculated based on a predetermined second hash function, the first hash function based on metadata and data of the will document and the second hash function based on metadata and data of the video file; modifying 1068, using the blockchain manager 226, one or both of: (i) a copy of the first hash value or the first hash function to provide a modified hash value for the will document (such as by modifying 1068, using the blockchain manager 226, a copy of the first hash value or the first hash function based on the second hash function, the second hash value and/or the metadata of the video file, to provide the modified hash value for the will document); and/or (ii) a copy of the second hash value or the second hash function to provide another modified hash value for the video file (such as by modifying 1068, using the blockchain manager 226, a copy of the second hash value or the second hash function based on the first hash function, the first hash value and/or the metadata of the electronic will to provide another modified hash value for the video file); and creating 1070, using the blockchain manager 226, a data block in the distributed ledger 103, based at least on the modified hash value (e.g., the data block may include the modified hash value, the second hash value, the first timestamp, and the second timestamp).

In this way, the signed electronic will (whether digitally signed, or manually signed and then converted into an electronic document, such as by digital scanning or digital image capture) may serve as the primary key or driver for records management and tracking, unlike traditional client or client ID-driven will management solutions. The will creation process is managed based on a type of legal document, e.g. an electronic will, being selected, such that all data in (a) the data repository (e.g., the database 212, 216, 108, 208 and vault 210) and (b) a data block in the distributed ledger 103, is stored (or associated) with respect to that legal document, e.g., an electronic will document. In some aspects, the signed electronic will document may be associated with a video file, in accordance with the video signing process described above. In an aspect, a first hash value for the will document is modified to produce a modified hash value (for the will document). Modifying the first hash value is done to counter, at least in part, hash function collision and hash attack, and does not change the signed electronic will document itself, which may be separately stored in the vault 210. As such, in an aspect, a data block (e.g., datablock #1) corresponding to the will document may include the modified hash value (for the will document), the second hash value (for the corresponding video file), the first timestamp, and the second timestamp. In another aspect, instead of modifying the first hash value, the second hash value may be modified to generate a modified hash value (for the corresponding video file) to at least partially counter the problems of hash function collision and hash attack, in which case the data block (e.g., datablock #1) corresponding to the will document may include the modified hash value (for the video file), the first hash value (for the will document), the first time stamp, and the second time stamp.

In accordance with some aspects, if there is any change in the will document, the testator may need to sign the will document once again to confirm such change, e.g., via the video signing process, which will lead to the creation of an updated electronic will document (which may be related to the previous version of the will document) and the corresponding new video file. Accordingly, the blockchain manager 226 may again calculate a new first hash value (for the updated will document) and a new second hash value (for the corresponding new video file). Either the new first hash value or the new second hash value may then be modified to produce a new modified hash value, as described above, to at least partially counter the problems of hash function collision and hash attack. Subsequently, the blockchain manager 226 may update a data structure of the distributed ledger 103 to include a new data block (e.g., datablock #2), which may include the (i) new modified hash value (which, for the updated will document, may be created in accordance with the first implementation described above), the new second hash value (for the corresponding new video file), a new first timestamp, a new second timestamp, and a link to the last-created data block (e.g., datablock #1). In another aspect, where the updated signed electronic will document is signed by the testator via the manual (i.e., non-video) signing process, the new data block (i.e., datablock #2) may only include the new modified hash value (for the updated will document), the new first timestamp, and a link to the last-created data block (e.g., datablock #1). As such, each chain of data blocks in the distributed ledger 103 may correspond to the will document (or type thereof) and represent a lifecycle of that will document (instead of a typical lifecycle based on a client ID, as in existing solutions). In accordance with some aspects, no separate data block is required to be created particularly for any video file.

In accordance with some aspects, the method 1000 may further comprise: receiving 1072, by the at least one processing node 200, over the network 102, from any of the host node(s) 104 and the service node(s) 106, an indication of a will triggering event that is an executor wallet triggering event (as described above); and transferring or providing 1074, by the blockchain manager 226, the digital wallet or access to the digital wallet to a node 106 that is associated with an executor (or trustee) of an estate of the testator. For example, upon receipt of the executor wallet triggering event indication, the input engine 222 may trigger the blockchain manager 226, which may be configured to (i) create a smart contract between the trustee or executor (or the trustee or executor service node 106) and the testator (or testator's service node 106), such as where the will triggering event comprises an indication of the death of the testator (or outright request by the testator to create a trustee digital wallet while the testator is alive)), and (ii) transfer or provide the testator's digital wallet, or access rights/permissions thereto, to the trustee or executor (or the trustee or executor service node 106), as described above.

Figure 12:
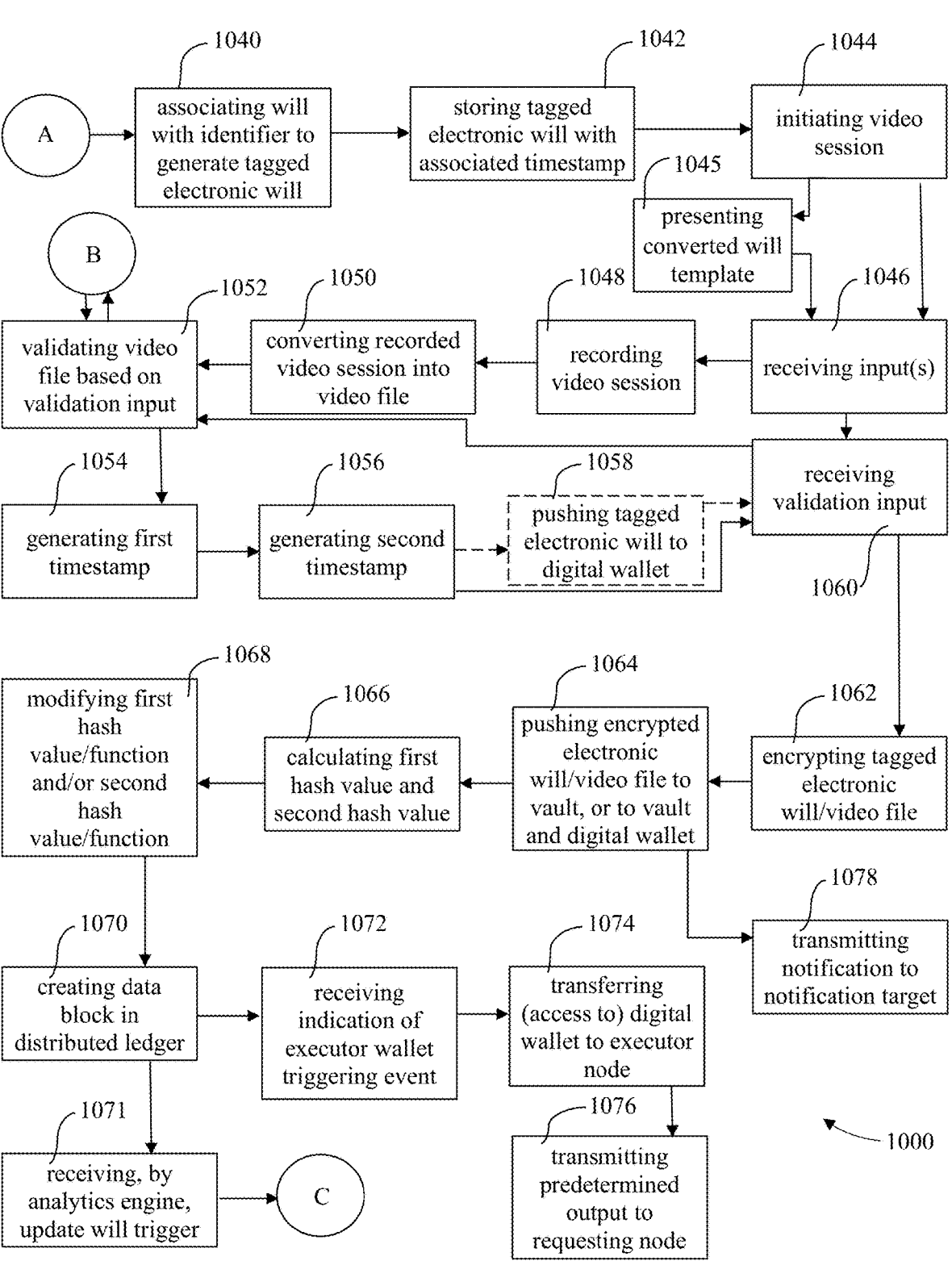
FIG. 12 depicts a flow diagram of another example of a method described herein.

In some aspects, as described above, the at least one processing node 200 may further include the analytics engine 228 and the promotions engine 230, each of the analytics engine 228 and the promotions engine 230 communicatively coupled to the processor(s) 202, and the method 1000 may further comprise: transmitting 1076, via the analytics engine 228 over the network 102, an analytics output (which may comprise a predetermined output) to a requesting node including one or more of the host node(s) 104 and the service node(s) 106. The analytics output may include one or more visualizations, recommendations, and/or updates, and may be based on the input data and a role associated with the requesting node. In some aspects, the method 1000 may also comprise transmitting 1078, via the promotions engine 230 over the network 102, a notification to a notification target including one or more of the host node(s) 104 and service node(s) 106, the notification including at least one of messages, alerts, reminders, social media feeds, and advertisements, for example. The notification may be based on the input data (such as the attorney data) and a role associated with the notification target. Transmitting 1078 the notification to the notification target may, in some aspects, take place any time after the electronic will is pushed to the digital wallet 1058, 1064 (and does not necessarily follow just step 1064 as shown in FIG. 12, which, like FIG. 11, depicts only one example flow of method steps).

Figure 13:
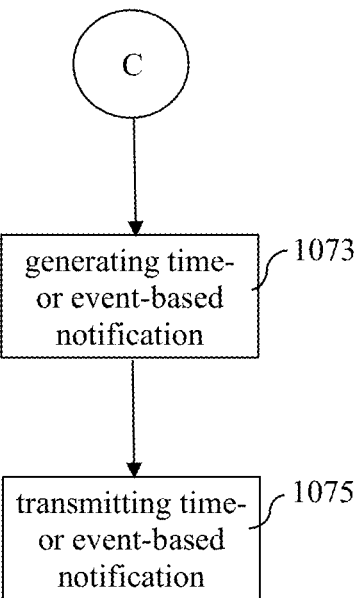
FIG. 13 depicts a flow diagram of another example of a method described herein.

With reference to FIG. 13, in accordance with some aspects, the method 1000 may also comprise receiving 1071, by the analytics engine 228 (such as over the network 102 from a node 104, 106 and/or from the legal engine 224 based on a preconfigured event reminder or trigger stored in the database 212), an update will trigger notification, and generating 1073 a time-based and/or event-based notification (e.g., an update or reminder) based on the update will trigger notification, such as for the client (e.g., a testator) service node 106, via the analytics engine 228, such as for updating a signed will of a client/testator (which would, once updated, require a further execution process as described herein). The method 1000 may further comprise transmitting 1075 the time-based and/or event-based notification, via the analytics engine 228 over the network 102, to one or more of the host node(s) 104 and service node(s) 106. In this way, the step of transferring 1074 the digital wallet, or access to the digital wallet, to an executor node 106 may be triggered by the creation of a smart contract between the testator and the executor, based on a will triggering event that is an executor wallet triggering event (such as where the will triggering event comprises an indication of the death of the testator, as described above), whereas the step of generating 1073 and transmitting 1075 the time- or event-based notification may be triggered by the analytics engine 228 based on an update will trigger notification.

For example, an attorney may receive, such as at an associated host node 106 and/or a mobile or web app interface 223 accessible by the attorney, over the network 102, a reminder from the analytics engine 228 with respect to a signed electronic will that is now, e.g., four years old, to follow up with the client (e.g., the testator) to update their will. The attorney may then send a reminder email to the client, or trigger, such as via a GUI 223 of the analytics engine 228, the transmitting 1075 of the time-based reminder notification, such as on wallet, to the client, over the network 102.

In another example, the analytics engine 228 may determine that a beneficiary (e.g., a child) has become a major based on their date of birth. The analytics engine 228 may then generate 1073 and transmit 1075 a reminder to the attorney to follow up with the client for updating their will, as described above. The attorney may then send a reminder email to the client, or trigger, such as via a GUI 223 of the analytics engine 228, the transmitting 1075 of the reminder notification, such as on wallet, to the client, over the network 102.

In yet another example, the analytics engine may determine that legislation relevant to an asset category (e.g., legislation on cottages) owned by the client (e.g., a testator) in a particular region has changed. In the manner described above, the analytics engine 228 may then generate 1073 and transmit 1075 a reminder to the attorney to follow up with the client for updating their will. The attorney may then send a reminder email to the client, or trigger, such as via a GUI 223 of the analytics engine 228, the transmitting 1075 of the reminder notification, such as on wallet, to the client, over the network 102.

In other aspects, any such reminders may be generated 1073 and sent 1075 automatically by the analytics engine 228 over the network 102 to the client, such as on wallet or web app of the client.

In accordance with some aspects, a system 100 for creating or managing legal documents may comprise a non-transitory computer-readable decentralized data storage (DDS) 108, 208, a distributed ledger 103, one or more nodes 104, 106, and a network 102. The DDS 108, 208, distributed ledger 103 and the node(s) 104, 106 may be communicatively coupled to each other over the network 102. Each of the nodes 104, 106 may include one or more processors 402 communicatively coupled to interfaces 406 and a local and/or remote non-transitory computer-readable medium 404 including instructions executable by the processor(s) 402 to carry out any of the method steps described herein. The processors 402, interfaces 406 and non-transitory computer-readable mediums 404 may be as described above. The node(s) 104, 106 may include: at least one host node 104, each host node 104 associated with a legal service provider; at least one service node 106, each service node 106 associated with an entity seeking legal service; and at least one processing node 200, each processing node 200 further comprising an input engine 222 for prompting for and/or receiving input, a legal engine 224, and a blockchain manager 226, as described above. Each of the input engine 222, the legal engine 224 and the blockchain manager 226 may be communicatively coupled to the processor(s) 202 of the respective processing node 200, as also described above. Further, as described above, each processing node 200 may additionally include an analytics engine 228 and/or a promotions engine 230, as well as a database 212 which may include an archive 214 and a data store 216, as described above. Also as previously described, the processor(s) 202 of each processing node 200 may be communicatively coupled to the interfaces 204 and the memory 206 thereof (including the input engine 222, the legal engine 224, the blockchain manager 226, the analytics engine 228, the promotions engine 230, and the database 212 (including the archive 214 and the data store 216)).

In some aspects, a processing node 200 for creating or managing legal documents may comprise an input engine 222 for prompting for and/or receiving input, a legal engine 224, a blockchain manager 226, interface(s) 204, 406, a local and/or remote non-transitory computer-readable medium 206, 212, 214, 216, 404, and at least one processor 202, 402. The at least one processor 202, 402 may be communicatively coupled to the interface(s) 204, 406, the local and/or remote non-transitory computer-readable medium 206, 212, 214, 216, 404, the input engine 222, the legal engine 224, and the blockchain manager 226. The local and/or remote non-transitory computer-readable medium 206, 212, 214, 216, 404 may include instructions executable by the at least one processor 202, 402 to: receive 1006, using the input engine 222, input data over a network 102 from at least one host node 104 and/or at least one service node 106

(the at least one host node 104 may be associated with a legal service provider, and the at least one service node 106 may be associated with an entity seeking legal service), the input data including at least a legal service to be provided to the at least one service node 106; generate 1010, using the legal engine 224, at least one legal clause and/or at least one legal document from a predetermined list of legal clause(s) and/or legal document(s), based on the received input data; and store 1012 the at least one legal clause and/or at least one legal document in a decentralized data storage (DDS), the DDS accessible by the processing node 200, the at least one host node 104 and the at least one service node 106 over the network 102.

In accordance with some aspects, a computer-implemented method 1000 of creating or managing legal documents may comprise: providing 1002 a decentralized legal document management (DWM) system including a non-transitory computer-readable decentralized data storage (DDS) 108, 208, a distributed ledger 103 and at least one node 104, 106, the DDS 108, 208, the distributed ledger 103 and the at least one node 104, 106 communicatively coupled to each other over a network 102. The at least one node 104, 106 may each include at least one processor 202, 402 communicatively coupled to interfaces 204, 406 and a local and/or remote non-transitory computer-readable medium 206, 212, 214, 216, 404 including instructions executable by the respective at least one processor 202, 402. The node(s) 104, 106 may include: at least one host node 104 associated with a legal service provider; at least one service node 106 associated with an entity seeking legal service; and at least one processing node 200. Each processing node 200 may further comprise an input engine 222 for prompting for and/or receiving input, a legal engine 224, and a blockchain manager 226. Each of the input engine 222, the legal engine 224 and the blockchain manager 226 may be communicatively coupled to the processor(s) 202, 402 of the respective processing node 200. In some aspects, the computer-implemented method 1000 may further comprise: receiving 1006, using the input engine 222, input data over the network 102 from the host node(s) 104 and/or the service node(s) 106, the input data including at least a legal service to be provided to the service node(s) 106; generating 1010, using the legal engine 224, at least one legal clause and/or at least one legal document from a predetermined list of legal clause(s) and/or legal document(s), based on the received input data; storing 1012 the at least one legal clause and/or at least one legal document in the DDS 108, 208, the DDS 108, 208 accessible by the host node(s) 104 and the service node(s) 106 over the network 102; calculating 1066, using the blockchain manager 226, a first hash value for a will document derived from the at least one legal clause and/or at least one legal document, and a second hash value for a video file derived from a digital video recording of a signing, or signing and witnessing, of the will document, the first hash value being calculated based on a predetermined first hash function and the second hash value being calculated based on a predetermined second hash function, and the first hash function may be based on metadata and data of the will document and the second hash function may be based on metadata and data of the video file; modifying 1068, using the blockchain manager 226, a copy of the first hash value or the first hash function to provide a modified hash value for the will document; and creating 1070, using the blockchain manager 226, a data block in the distributed ledger 103, the data block based at least on the modified hash value.

Example aspects herein are intended to cover all software or computer programs capable of performing the various determinations, calculations, etc., described herein or required by the aspects described herein for the disclosed purposes. For example, example aspects are intended to cover all software or computer programs capable of enabling processors to implement the disclosed processes. In other words, example aspects are intended to cover all systems and processes that configure a computing device to implement the disclosed processes. Example aspects are also intended to cover any and all currently known or later developed non-transitory recording or storage mediums (such as a CD-ROM, DVD-ROM, hard drive, RAM, ROM, floppy disc, magnetic tape cassette, etc.) that record or store such software or computer programs. Example aspects are further intended to cover such software, computer programs, systems and/or processes provided through any other currently known or later developed medium usable for implementing the example method steps or operations described herein.

In accordance with the example aspects, the disclosed computer programs may be executed in many example ways, such as an application that is resident in the memory of a network node or as a hosted application that is being executed on a server and communicating with the node application or browser via a number of standard protocols, such as TCP/IP, HTTP, XML, SOAP, REST, JSON, RPC, and other suitable protocols. The disclosed computer programs may be written in example programming languages that execute from memory on the computing device or from a hosted server, such as BASIC, COBOL, C, C++, Java, Pascal, or scripting languages such as JavaScript, Python, Ruby, PHP, Perl or other suitable programming language(s).

The terminology used herein is for the purpose of describing particular aspects only and is not intended to be limiting of the disclosure. It will be appreciated that several of the above-disclosed and other features, functions, and steps, or alternatives thereof, may be combined into other systems, applications or methods. Various presently unforeseen or unanticipated alternatives, modifications, variations, or improvements therein may subsequently be made by those skilled in the art without departing from the scope of the present disclosure. Any method steps described herein may be performed in any suitable sequence, order or arrangement, despite that particular example sequences, orders or arrangements have been shown and/or described herein.

The invention claimed is:

1. A computer-implemented method of creating or managing legal documents, the method comprising:

providing a decentralized legal document management (DWM) system including a non-transitory computer-readable decentralized data storage (DDS), a distributed ledger and at least one node, the DDS, the distributed ledger and the at least one node communicatively coupled to each other over a network, the at least one node each including at least one processor communicatively coupled to a local and/or remote non-transitory computer-readable medium including instructions executable by the respective at least one processor, the at least one node including: at least one host node, each said at least one host node associated with a legal service provider; at least one service node, each said at least one service node associated with an entity seeking legal service; and at least one processing node, each said at least one processing node further comprising an input engine for prompting for and/or receiving input, a legal engine, and a blockchain manager, each of the input engine, the legal engine and the blockchain manager communicatively coupled to the at least one processor of the respective at least one processing node;

receiving, using the input engine, input data over the network from the at least one host node and/or the at least one service node, the input data including at least a legal service to be provided to the at least one service node;

generating, using the legal engine, at least one legal clause and/or at least one legal document from a predetermined list of legal clause(s) and/or legal document(s), based on the received input data;

storing the at least one legal clause and/or at least one legal document in the DDS, the DDS accessible by the at least one host node and the at least one service node over the network;

calculating, using the blockchain manager, a first hash value for a will document derived from the at least one legal clause and/or at least one legal document, and a second hash value for a video file derived from a digital video recording of a signing, or signing and witnessing, of the will document, the first hash value being calculated based on a predetermined first hash function and the second hash value being calculated based on a predetermined second hash function, wherein the first hash function is based on metadata and data of the will document and the second hash function is based on metadata and data of the video file;

modifying, using the blockchain manager a copy of the first hash value or the first hash function to provide a modified hash value for the will document; and creating, using the blockchain manager, a data block in the distributed ledger, the data block based at least on the modified hash value.

2. The computer-implemented method of claim 1 wherein the legal service to be provided comprises an electronic will and the input data includes a will type, wherein the predetermined list of legal clause(s) and/or legal document(s) comprises legal clause(s) and/or legal document(s) relevant to the will type, and wherein:

the entity seeking legal service and associated with the at least one service node is a testator;

the at least one node further includes at least one remote node, each said at least one remote node associated with at least one witness designated by the testator or an attorney; and the input data further comprises details of parties relevant to the electronic will, asset details for the electronic will, and asset allocation details for the electronic will.

3. The computer-implemented method of claim 2 wherein the generating the at least one legal clause provides a first set of clause(s), the at least one legal clause being selected based on at least one of:

(i) relative locations of the parties with respect to a testator location, determined based on the input data, (ii) asset location, determined based on the input data, and (iii) a will type relevant for the testator, determined based on the input data;

wherein the first set of clause(s) comprises at least one clause type.

4. The computer-implemented method of claim 3 wherein the generating the at least one legal clause further comprises:

deselecting, using the legal engine, at least one clause from the first set of clause(s) to provide a second set of clause(s).

5. The computer-implemented method of claim 4 wherein the at least one deselected clause is deselected based on at least document length, wherein the document length is: (i)

predetermined or (ii) dynamically defined by the legal engine based on the input data.

6. The computer-implemented method of claim 4 wherein the second set of clause(s) includes at least one legal clause of each of the at least one clause type.

7. The computer-implemented method of claim 4 wherein the stored at least one legal clause and/or at least one legal document in the DDS comprises a will template for creating the electronic will, wherein the will template is based on one of the first set of clause(s) and the second set of clause(s).

8. The computer-implemented method of claim 7 wherein the input data includes an existing will, the method further comprising parsing, by the legal engine, the existing will, to determine a set of existing legal clause(s), at least one of the existing legal clause(s) being appended to or used to otherwise update the predetermined list of legal clause(s), and/or the at least one legal clause of the first set of clause(s) being generated based further on the set of existing legal clause(s).

9. The computer-implemented method of claim 7 further comprising transmitting, from the at least one processing node to the at least one service node, over the network, the will template for review, input of corrected or additional data, approval, and/or execution by the testator.

10. The computer-implemented method of claim 9 further comprising, after receiving an approval of the will template from the testator over the network:

converting the approved will template to a predetermined file format;

storing the converted will template in the non-transitory computer-readable medium(s) of the at least one processing node, for access and execution by the testator;

receiving, by the input engine, the signed, or signed and witnessed, electronic will;

generating, by the legal engine, a timestamp indicating a time when the electronic will is received by the input engine;

generating a unique identifier for the electronic will and associating the electronic will with the unique identifier to generate a tagged electronic will; and storing the tagged electronic will with the associated timestamp in the non-transitory computer-readable medium(s) of the at least one processing node.

11. The computer-implemented method of claim 10 further comprising, after said storing the converted will template:

initiating, by the legal engine, a video session between the at least one host node, the at least one service node, and the at least one remote node over the network, for video recording signing of the converted will template by the testator on the at least one service node to generate the electronic will; and presenting, during the video session, by the legal engine over the network, the converted will template on a display of the interfaces of each of the at least one host node, the at least one service node, and the at least one remote node;

wherein:

scrolling of the converted will template on the display of the at least one host node similarly scrolls, in real-time or near real-time, the converted will template on the display of each of the at least one service node and the at least one remote node such that the at least one host node, the at least one service node, and the at least one remote node concurrently, or nearly concurrently, view like parts of the converted will template; and the converted will template is scrollable independently by each of the at least one service node and the at least one remote node when there is no said scrolling of the converted will template on the display of the at least one host node.

12. The computer-implemented method of claim 10 further comprising, after said storing the converted will template:

initiating, by the legal engine, a video session between the at least one host node, the at least one service node, and the at least one remote node over the network, for video recording signing of the converted will template by the testator on the at least one service node to generate the electronic will;

receiving, by the legal engine over the network, a first input from the at least one service node, a second input from the at least one host node and a third input from the at least one remote node during the video session, wherein the first input indicates the signing of the converted will template, the second input indicates a presence of a first user on the host node, and the third input indicates a presence of a second user on the remote node;

recording, using the legal engine, the video session; and converting, by the legal engine, the at least one host node, the at least one service node, or the at least one remote node, the recorded video session into a video file.

13. The computer-implemented method of claim 12 further comprising:

generating, by the legal engine, a first timestamp indicating a time at which the first input is received by the legal engine; and generating, by the legal engine, a second timestamp indicating a time at which the video file is generated, or received over the network, by the legal engine;

wherein the unique identifier includes the first input alone or in combination with at least one of the second input, the third input, the video file and/or metadata of the video file.

14. The computer-implemented method of claim 13 further comprising:

receiving, by the legal engine over the network, a validation input from the at least one host node and/or the at least one service node, the validation input validating at least the signing of the converted will template; and encrypting the tagged electronic will, or the tagged electronic will and the video file.

15. The computer-implemented method of claim 14 further comprising:

pushing, by the legal engine, over the network, the encrypted tagged electronic will, or the encrypted tagged electronic will and the encrypted video file, to a secure digital vault of the DDS, or to both the secure digital vault of the DDS and to a digital wallet associated with the at least one service node.

16. The computer-implemented method of claim 15 further comprising:

receiving, by the at least one processing node, over the network, from any of the at least one host node and the at least one service node, an indication of an executor wallet triggering event; and transferring, by the blockchain manager, the digital wallet or access to the digital wallet to a node of the at least one node, the node associated with an executor of an estate of the testator.

17. The computer-implemented method of claim 13 wherein the at least one processing node further includes an analytics engine and a promotions engine, each of the analytics engine and the promotions engine communicatively coupled to the at least one processor, the method further comprising:

transmitting, via the analytics engine over the network, analytics output to a requesting node including one or more of the at least one host node and the at least one service node, the analytics output including one or more visualizations, recommendations, and/or updates, wherein the analytics output is based on the input data and a role associated with the requesting node; and/or transmitting, via the promotions engine over the network, a notification to a notification target including one or more of the at least one host node and the at least one service node, the notification including at least one of messages, alerts, reminders, social media feeds, and advertisements, wherein the notification is based on the input data and a role associated with the notification target.

* * * * *